United States Patent
Kim et al.

(10) Patent No.: US 12,463,218 B2
(45) Date of Patent: Nov. 4, 2025

(54) POSITIVE ACTIVE MATERIAL FOR ALL SOLID SECONDARY BATTERY, AND ALL SOLID SECONDARY BATTERY INCLUDING THE SAME

(71) Applicant: SAMSUNG SDI CO., LTD., Yongin-si (KR)

(72) Inventors: Youngsoo Kim, Yongin-si (KR); Byungjin Choi, Yongin-si (KR); Sukgi Hong, Yongin-si (KR); Jongmin Kim, Yongin-si (KR); Jeongho Lee, Yongin-si (KR); Sangil Han, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 743 days.

(21) Appl. No.: 17/709,782

(22) Filed: Mar. 31, 2022

(65) Prior Publication Data

US 2022/0328835 A1 Oct. 13, 2022

(30) Foreign Application Priority Data

Apr. 2, 2021 (KR) .................. 10-2021-0043502

(51) Int. Cl.
*H01M 4/62* (2006.01)
*H01M 4/1391* (2010.01)
(Continued)

(52) U.S. Cl.
CPC .......... *H01M 4/62* (2013.01); *H01M 4/1391* (2013.01); *H01M 4/364* (2013.01); *H01M 4/38* (2013.01);
(Continued)

(58) Field of Classification Search
CPC ................ H01M 4/62; H01M 4/525
See application file for complete search history.

(56) References Cited

U.S. PATENT DOCUMENTS 8,765,303 B2 * 7/2014 Chen ............. H01M 4/133
429/221
2012/0328945 A1 * 12/2012 Hirose ........... H01M 10/0587
429/219
(Continued)

FOREIGN PATENT DOCUMENTS

KR           101523081 B1 *  6/2015  ............. C01F 7/50
KR     10-2016-0021013 A     2/2016
(Continued)

OTHER PUBLICATIONS

European Search Report dated Aug. 1, 2022.
(Continued)

*Primary Examiner* — Maria Laios
*Assistant Examiner* — Benjamin T Lustgraaf
(74) *Attorney, Agent, or Firm* — Lee IP Law, P.C.

(57) ABSTRACT

A positive active material for an all-solid secondary battery, an all-solid secondary battery including the same, and a method of manufacturing the positive active material for an all-solid secondary battery, the positive active material including a secondary particle including a plurality of primary particles; and a buffer layer on a surface of the secondary particle; wherein the secondary particle includes a nickel lithium transition metal oxide represented by Formula 1, the buffer layer includes a copper compound represented by Formula 2, $Li_aNi_bM^1_cO_{2-e}A_e$  <Formula 1>

$Li_xCu_yX_z$.  <Formula 2>

21 Claims, 26 Drawing Sheets

(51) Int. Cl.
   *H01M 4/36* (2006.01)
   *H01M 4/38* (2006.01)
   *H01M 4/525* (2010.01)
   *H01M 10/0525* (2010.01)
   *H01M 10/0562* (2010.01)

(52) U.S. Cl.
   CPC ....... *H01M 4/525* (2013.01); *H01M 10/0525* (2013.01); *H01M 10/0562* (2013.01)

(56) References Cited

U.S. PATENT DOCUMENTS

| | | | |
|---|---|---|---|
| 2015/0357638 A1 | 12/2015 | Sun et al. | |
| 2016/0043392 A1* | 2/2016 | Fujiki | G01R 31/392 |
| | | | 429/231.95 |
| 2016/0164135 A1* | 6/2016 | Fasching | H01M 4/62 |
| | | | 429/231.95 |
| 2017/0179470 A1* | 6/2017 | Choi | C01G 53/50 |
| 2018/0219214 A1* | 8/2018 | Zhamu | H01M 4/625 |
| 2021/0143428 A1* | 5/2021 | Browne | H01M 4/0471 |

FOREIGN PATENT DOCUMENTS

| | | |
|---|---|---|
| KR | 10-2017-0073217 A | 6/2017 |
| KR | 10-1922698 B1 | 11/2018 |
| WO | WO 2020-026508 A1 | 2/2020 |

OTHER PUBLICATIONS

Kim et al. Stabilizing Effect of a Hybrid Surface Coating On a Ni-Rich NCM Cathode Material in All-Solid-State Batteries.

Jung et al. Ni-Rich Layered Cathode Materials With Electrochemo-Mechanically Compliant Microstructures for All-Solid-Sate Li Batteries.

Jung et al. Li3Bo3—Li2CO3: Rationally Designed Buffering Phase for Sulfide All-Solid-State Li-Ion Batteries.

G. Zhao et al, "Enhanced Electrochemical Performances Of LiNi0.5Mn1.5O4 By Surface Modification With Cu Nanoparticles", J. Mining and Metallurgy. Section B . Metallurgy, 2017, vol. 53, pp. 61-66 (Dec. 31, 2016).

Koran Office action dated Sep. 25, 2025, in KR Patent Application No. 10-2021-0043502.

* cited by examiner

POSITIVE ACTIVE MATERIAL FOR ALL SOLID SECONDARY BATTERY, AND ALL SOLID SECONDARY BATTERY INCLUDING THE SAME

CROSS-REFERENCE TO RELATED APPLICATION

This application is based on and claims priority under 35 U.S.C. § 119 to Korean Patent Application No. 10-2021-0043502, filed on Apr. 2, 2021, in the Korean Intellectual Property Office, the disclosure of which is incorporated by reference herein in its entirety.

BACKGROUND

1. Field

Embodiments relate to a positive active material for an all-solid secondary battery and an all-solid secondary battery including the same.

2. Description of the Related Art

Some lithium secondary batteries could easily ignite when exposed to moisture in the air, since they use liquid electrolytes, and stability issues have always been raised. As more electric vehicles are coming into use, stability is becoming more of an issue. As a result, recently, all-solid-state secondary batteries using a solid electrolyte made of an inorganic material have been considered, in order to improve safety.

An all-solid-state battery does not use a combustible organic dispersion medium, and thus may significantly reduce the likelihood of a fire or an explosion even if a short circuit occurs. Therefore, such an all-solid-state battery may greatly increase safety as compared to a lithium-ion battery using a liquid electrolyte.

SUMMARY

The embodiments may be realized by providing a positive active material for an all-solid secondary battery, the positive active material including a secondary particle including a plurality of primary particles; and a buffer layer on a surface of the secondary particle; wherein the secondary particle includes a nickel lithium transition metal oxide represented by Formula 1, the buffer layer includes a copper compound represented by Formula 2, $$Li_aNi_bM^1_cO_{2-e}A_e \qquad \text{<Formula 1>}$$

in Formula 1, $M^1$ is an element of Groups 4 to 14, A is F, S, Cl, Br, or a combination thereof; and a, b, c, and e satisfy the following relations: $0.9 \leq a \leq 1.3$, $0.5 \leq b < 1$, $0 < c < 1$, $b+c=1$, and $0 \leq e < 1$.

$$Li_xCu_yX_z \qquad \text{<Formula 2>}$$

in Formula 2, X is a halogen, and x, y, and z satisfy the following relations: $0 \leq x \leq 3$, $1 \leq y \leq 5$, and $1 \leq z \leq 5$.

In Formula 2, X may be F, Cl, Br, I, or a combination thereof.

The copper compound represented by Formula 2 may be represented by Formula 2a or Formula 2b, $$Cu_yCl_z \qquad \text{<Formula 2a>}$$

in Formula 2a, y and z may satisfy the following relations: $1 \leq y \leq 5$, and $1 \leq z \leq 5$, $$Li_xCu_yCl_z \qquad \text{<Formula 2b>}$$

in Formula 2b, x, y, and z may satisfy the following relations: $0 \leq x \leq 3$, $1 \leq y \leq 5$, $1 \leq z \leq 5$.

The positive active material may include the copper compound in an amount of about 0.0005 mol % to about 0.2 mol %, based on 100 mol % of the nickel lithium transition metal oxide.

The positive active material may include the copper compound in an amount of about 0.005 mol % to about 0.1 mol %, based on 100 mol % of the nickel lithium transition metal oxide.

The copper compound may be further included at interfaces between the plurality of primary particles.

The buffer layer may be in a crystalline phase.

The buffer layer may be in a mixed phase of a crystalline phase and an amorphous phase.

The nickel lithium transition metal oxide represented by Formula 1 may be represented by Formula 1a, $$Li_aNi_bM^2_cM^3_dO_{2-e}A_e \qquad \text{<Formula 1a>}$$

in Formula 1a, $M^2$ may be Co, Mn, Al, or a combination thereof, $M^3$ may be boron (B), magnesium (Mg), calcium (Ca), strontium (Sr), barium (Ba), titanium (Ti), vanadium (V), chromium (Cr), iron (Fe), copper (Cu)), zirconium (Zr), aluminum (Al), phosphorus (P), zinc (Zn), silicon (Si), niobium (Nb), cobalt (Co), or a combination thereof; A may be F, S, Cl, Br, or a combination thereof, and a, b, c, d, and e may satisfy the following relations: $0.8 \leq a \leq 1.2$, $0.7 \leq b < 1$, $0 < c < 1$, $0 < d < 1$, $b+c+d=1$, and $0 \leq e < 1$.

The nickel lithium transition metal oxide represented by Formula 1 may be represented by Formula 1b, $$Li_aNi_bCo_cM^4_dO_2 \qquad \text{<Formula 1b>}$$

in Formula 1b, $M^4$ may be Al, Mn, Zr, Mg, or a combination thereof, and a, b, c, and d may satisfy the following relations: $0.9 \leq a \leq 1.1$, $0.7 \leq b < 1$, $0 < c \leq 0.3$, $0 < d \leq 0.3$, and $b+c+d=1$.

The nickel lithium transition metal oxide may include nickel in an amount of about 80 mol % to about 98 mol %, based on a total number of moles of transition metals in the nickel lithium transition metal oxide.

The positive active material may have a remainder of lithium of about 100 ppm or more. The remainder of lithium content means the mass of the remainder of lithium with respect to one million of the total mass of the positive active material layer.

The embodiments may be realized by providing a cathode for an all-solid secondary battery, the cathode including the positive active material for an all-solid secondary battery according to an embodiment.

The cathode for an all-solid secondary battery may further include a solid electrolyte.

The solid electrolyte may be a sulfide solid electrolyte, and the sulfide solid electrolyte may include $Li_2S-P_2S_5$, $Li_2S-P_2S_5-LiCl$, $Li_2S-P_2S_5-LiBr$, $Li_2S-P_2S_5-LiCl-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$, in which m and n are each independently a positive number, and Z is Ge, Zn, or Ga, $Li_2S-GeS_2$, $Li_2S-SiS_2-Li_3PO_4$, $Li_2S-SiS_2-Li_pMO_q$, in which p and q are each independently a positive number, and M is P, Si, Ge, B, Al, Ga, or In, $Li_{7-x}PS_{6-x}Cl_x$, in which $0 \leq x \leq 2$, $Li_{7-x}PS_{6-x}Br_x$, in which $0 \leq x \leq 2$, and $Li_{7-x}PS_{6-x}I_x$, in which $0 \leq x \leq 2$.

The cathode may include the solid electrolyte in an amount of about 5 parts by weight to about 10 parts by weight, based on 100 parts by weight of the cathode.

The embodiments may be realized by providing an all-solid secondary battery including a cathode layer; an anode layer; and a sulfide solid electrolyte layer between the cathode layer and the anode layer; wherein the cathode layer includes the cathode according to an embodiment.

The sulfide solid electrolyte layer may include $Li_2S$—$P_2S_5$, $Li_2S$—$P_2S_5$—$LiCl$, $Li_2S$—$P_2S_5$—$LiBr$, $Li_2S$—$P_2S_5$—$LiCl$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P2S_5$—$Z_mS_n$, in which m and n are each independently a positive number, and Z is Ge, Zn, or Ga, $Li_2S$—$GeS_2$, $Li_2S$—$SiS_2$—$Li_3PO_4$, $Li_2S$—$SiS_2$-$Li_pMO_q$, in which p and q are each independently a positive number, and M is P, Si, Ge, B, Al, Ga, or In, $Li_{7-x}PS_{6-x}Cl_x$, in which $0 \leq x \leq 2$, $Li_{7-x}PS_{6-x}Br_x$, in which $0 \leq x \leq 2$, and $Li_{7-x}PS_{6-x}I_x$, in which $0 \leq x \leq 2$.

The anode layer may include a negative electrode current collector and a negative active material layer on the negative electrode current collector, the negative active material layer may include a negative active material and a binder, the negative active material may be in a particle form, and an average particle diameter of the negative active material may be about 4 μm or less.

The negative active material may include a carbon negative active material, a metal negative active material, or a metalloid negative active material, and the carbon negative active material may include amorphous carbon or crystalline carbon.

The embodiments may be realized by providing a method of manufacturing the positive active material for an all-solid secondary battery according to an embodiment, the method including coating a nickel lithium transition metal oxide represented by the following Formula 1 with a coating solution including a catalyst and LiOH, the catalyst including $Cu_nX_m$, in which X is a halogen and n and m satisfy the following relations: $1 \leq n \leq 5$ and $1 \leq m \leq 5$, and drying and heat-treating the coated nickel lithium transition metal oxide,

<Formula 1> wherein, in Formula 1, $M^1$ is an element of Groups 4 to 14, A is F, S, Cl, Br, or a combination thereof; and a, b, c, and e satisfy the following relations: $0.9 \leq a \leq 1.3$, $0.5 \leq b < 1$, $0 < c < 1$, $b+c=1$, and $0 \leq e < 1$.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
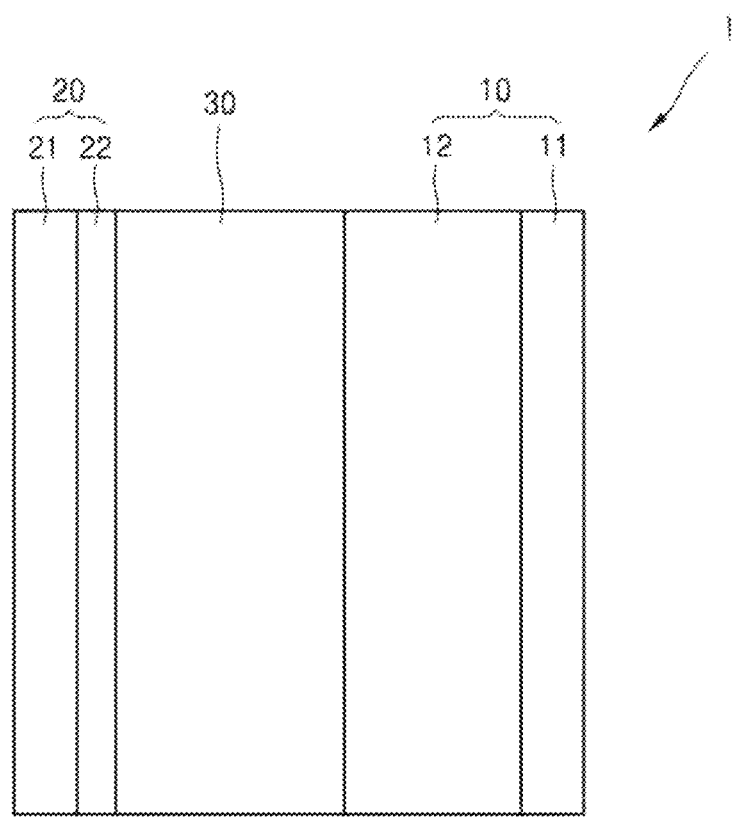
FIG. 1 is a structure of an all-solid secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Referring to the attached drawings, a more detailed description will be given below on a positive active material for an all-solid secondary battery, and a cathode including the same, and an all-solid secondary battery including the cathode.

As a solid electrolyte for an all-solid-state battery, a sulfide solid electrolyte may be used. However, reactions at the cathode of such a sulfide solid electrolyte could deteriorate performance, which should be addressed.

Accordingly, a cathode for an all-solid secondary battery, which may help prevent an irreversible lithium loss due to the high reactivity between a sulfide electrolyte and a positive active material and provide a stable lifetime characteristic may be provided.

A positive active material for an all-solid secondary battery according to an embodiment may include a secondary particle including a plurality of primary particles and a buffer layer on the surface of the secondary particle.

In an implementation, the secondary particle may include a nickel lithium transition metal oxide represented by the following Formula 1. In an implementation, the buffer layer may include a copper compound represented by the following Formula 2.

$$Li_aNi_bM^1_cO_{2-e}A_e \qquad \text{<Formula 1>}$$

In Formula 1, $M^1$ may be, e.g., an element of Groups 4 to 14. A may be, e.g., F, S, Cl, Br, or a combination thereof. a, b, c, and e may satisfy the following relations: $0.9 \leq a \leq 1.3$, $0.5 \leq b < 1$, $0 < c < 1$, $b+c=1$, and $0 \leq e < 1$.

$$Li_xCu_yX_z \qquad \text{<Formula 2>}$$

In Formula 2, X may be, e.g., a halogen. x, y, and z may satisfy the following relations $0 \leq x \leq 3$, $1 \leq y \leq 5$, $1 \leq z \leq 5$.

Some sulfide electrolytes may generate an irreversible lithium loss at a positive active material interface due to a high reactivity, which could rapidly decrease the long-life properties. The positive active material for an all-solid secondary battery according to an embodiment may form a buffer layer including the copper compound represented by Formula 2 as a surface protection layer to help control or reduce the above-described issues, and to help lower the degradation at the interface and the reactivity with a sulfide electrolyte, thereby improving the chemical resistance of the battery, and to provide a relatively low charge-transfer resistance so that Li ions may easily be charged and discharged.

The buffer layer may be a lithiophilic buffer layer in which side reactions with an electrolyte on the surface of the high-Ni lithium transition metal oxide may be minimized, and Li ions may be efficiently transferred to the inside of the active material.

The buffer layer, e.g., in which a copper catalyst (e.g., $CuCl_2$) is applied, by placing a copper compound of Li—Cu—X composition on the active material particle surface, may help provide an all-solid secondary battery with a high lithium conduction, a chemical resistance, a resistance to high voltage and a long-life performance.

The buffer layer may include a copper compound represented by Formula 2 below.

$$Li_xCu_yX_z \qquad \text{<Formula 2>}$$

In Formula 2, X may be a halogen, and x, y, and z may satisfy the following relations: $0 \leq x \leq 3$, $1 \leq y \leq 5$, $1 \leq z \leq 5$.

In an implementation, X in Formula 2 may be, e.g., F, Cl, Br, I, or a combination thereof.

In an implementation, the copper compound may include a compound represented by the following Formula 2a, a compound represented by the Formula 2b, or a combination thereof.

$$Cu_yCl_z \qquad \text{<Formula 2a>}$$

In Formula 2a, y and z may satisfy the following relations: $1 \leq y \leq 5$, $1 \leq z \leq 5$.

$$Li_xCu_yCl_z \qquad \text{<Formula 2b>}$$

In Formula 2b, x, y, and z may satisfy the following relations: $0 \leq x \leq 3$, $1 \leq y \leq 5$, $1 \leq z \leq 5$.

The high-Ni positive active material having the buffer layer, compared to a bare high-Ni positive active material without the surface protection layer, may better control a side reaction with the sulfide solid electrolyte and may help improve the lifetime and interface resistance properties at high/low temperature. The buffer layer may have lithiophilic properties, with a chemical resistance and Li-ion delivery functions simultaneously improved.

In an implementation, the positive active material may include the copper compound in an amount of, e.g., about 0.0005 mol to about 0.2 mol, based on 1 mol of the nickel lithium transition metal oxide. In an implementation, the positive active material may include the copper compound in an amount of, e.g., about 0.005 mol to about 0.1 mol, based on 1 mol of the nickel lithium transition metal oxide. Maintaining the amount of the copper compound in the above range may help ensure that the interfacial resistance of the positive active material may be effectively reduced and the capacity improvement effect may be obtained.

The buffer layer may be on the surface of the secondary particles (including the plurality of primary particles). In an implementation, there may be more of the copper compound on or at an interface between the plurality of primary particles. In an implementation, buffer layers may be formed not only on the (e.g., outer) surface of a secondary particle, but also on or at the interface of the primary particles as well, as it penetrates to the interface.

In an implementation, the buffer may exist in a crystalline state. The buffer layer may have a Li—Cu—Cl type nano crystal form.

In an implementation, the buffer layer may exist in an amorphous phase, or in a phase where a crystalline phase and an amorphous phase is mixed.

The thickness of the buffer layer may be, e.g., about 5 nm to about 100 nm, or about 10 nm to about 80 nm. In the above range, the interfacial resistance of the positive active material may be effectively reduced.

The buffer layer may be made of a particle or a thin film including the copper compound represented by the above Formula 2.

As the core of the positive active material in which such a buffer layer is formed, a nickel lithium transition metal oxide containing nickel (Ni) of about 50 mol % or more (based a total number of moles of the transition metal) may be used. By including a nickel content in the above range, a high capacity positive active material may be provided. In an implementation, based on the total number of moles of transition metals, the nickel lithium transition metal oxide may contain, e.g., about 55 mol % or more, about 60 mol % or more, about 65 mol % or more, about 70 mol % or more, about 75 mol % or more, about 80 mol % or more, about 85 mol % or more, or about 90 mol % or more of nickel (Ni). In an implementation, based on the total number of moles of transition metals, the nickel lithium transition metal oxide may contain about 80 mol % to about 98 mol % of nickel.

The nickel lithium transition metal oxide may be represented by the following Formula 1.

$$Li_aNi_bM^1_cO_{2-e}A_e \qquad \text{<Formula 1>}$$

In Formula 1, $M^1$ may be, e.g., an element of Groups 4 to 14 (of the periodic table). A may be, e.g., F, S, Cl, Br, or a combination thereof. a, b, c, and e may satisfy the following relations: $0.9 \leq a \leq 1.3$, $0.5 \leq b < 1$, $0 < c < 1$, $b+c=1$, and $0 \leq e < 1$.

In an implementation, the nickel lithium transition metal oxide may be represented by the following Formula 1a.

$$Li_aNi_bM^2_cM^3_dO_{2-e}A_e \qquad \text{<Formula 1a>}$$

In Formula 1a, $M^2$ may be, e.g., Co, Mn, Al or a combination thereof. $M^3$ may be, e.g., boron (B), magnesium (Mg), calcium (Ca), strontium (Sr), barium (Ba), titanium (Ti), vanadium (V), chromium (Cr), iron (Fe), copper (Cu)), zirconium (Zr), aluminum (Al), phosphorus (P), zinc (Zn), silicon (Si), niobium (Nb), cobalt (Co), or a combination thereof. A may be, e.g., F, S, Cl, Br, or a combination thereof. a, b, c, d, and e may satisfy the following relations: $0.8 \leq a \leq 1.2$, $0.7 \leq b < 1$, $0 < c < 1$, $0 < d < 1$, $b+c+d=1$, and $0 \leq e < 1$.

In an implementation, the nickel lithium transition metal oxide can be represented by Formula 1b below.

$$Li_aNi_bCo_cM^4_dO_2 \qquad \text{<Formula 1b>}$$

In Formula 1b, $M^4$ may be, e.g., Al, Mn, Zr, Mg, or a combination thereof. a, b, c, and d may satisfy the following relations: $0.9 \leq a \leq 1.1$, $0.7 \leq b < 1$, $0 < c < 0.3$, $0 < d \leq 0.3$, and $b+c+d=1$.

As described above, by using a nickel lithium transition metal oxide having a high content of nickel, a cathode having an excellent capacity property may be obtained. An amount of cobalt in Formula 1b may be about 0.5 mol % to 30 about mol %, e.g., about 1 mol % to about 25 mol %, or about 3 mol % to about 20 mol %.

When $M^4$ in Formula 1b is manganese, an amount of manganese may be about 0.2 mol % to about 5 mol %, e.g., about 0.3 mol % to about 4 mol %, or about 0.4 mol % to about 3 mol %. When $M^4$ in Formula 1b is aluminum, an amount of aluminum may be about 0.2 mol % to about 5 mol %, e.g., about 0.3 mol % to about 4 mol %, or about 0.5 mol % to about 3 mol %.

The nickel lithium transition metal oxide may be, e.g., a compound represented by Formula 3 or a compound represented by the following Formula 4.

$$LiNi_{1-x-y}Co_xAl_yO_2 \qquad \text{<Formula 3>}$$

In Formula 3, x and y may satisfy the following relations: $0.005 \leq x \leq 0.3$, and $0.002 \leq y \leq 0.05$.

$$LiNi_{1-x-y}Co_xMn_yO_2 \qquad \text{<Formula 4>}$$

In Formula 4, x and y may satisfy the following relations: $0.005 \leq x \leq 0.3$, $0.002 \leq y \leq 0.05$.

In an implementation, the compound of Formula 3 may include, e.g., about 80 mol % to about 98 mol % of nickel, about 0.5 mol % to about 30 mol % of cobalt, and about 0.2 mol % to about 5 mol % of aluminum.

In an implementation, the compound of Formula 4 may include, e.g., about 80 mol % to about 98 mol % of nickel, about 0.5 mol % to about 30 mol % of cobalt, and about 0.2 mol % to about 5 mol % of manganese.

In an implementation, the nickel lithium transition metal oxide may be, e.g., $LiNi_{0.896}Co_{0.072}Mn_{0.031}O_2$, $LiNi_{0.917}Co_{0.069}Al_{0.014}O_2$, $LiNi_{0.88}Co_{0.105}Al_{0.015}O_2$, $LiNi_{0.88}Co_{0.105}Mn_{0.015}O_2$, $LiNi_{0.845}Co_{0.105}Mn_{0.05}O_2$, or the like.

The positive active material may be prepared, e.g., by the following preparation method.

A preparation method of a positive active material of an all-solid secondary battery according to an embodiment is may include, coating the nickel lithium transition metal oxide represented by Formula 1 with a coating solution including a catalyst and LiOH, the catalyst containing $Cu_nX_m$ in which $1 \leq n \leq 5$, $1 \leq m \leq 5$, and X is a halogen, and drying and heat-treating the coated nickel lithium transition metal oxide.

The positive active material for an all-solid secondary battery synthesized by using a $Cu_nX_m$ catalyst and LiOH through a sol-gel method may introduce a protective layer of the structure $Li_x$—$Cu_y$—$X_z$ on the surface of the nickel lithium transition metal oxide as described above.

A cathode for an all-solid secondary battery according to an embodiment may include the positive active material as described above.

In an implementation, the cathode may further include a solid electrolyte along with a positive active material.

The solid electrolyte may be a sulfide solid electrolyte, e.g., $Li_2S$—$P_2S_5$, $Li_2S$—$P_2S_5$—LiCl, $Li_2S$—$P_2S_5$—LiBr, $Li_2S$—$P_2S_5$—LiCl—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, (where m and n are positive numbers and Z is Ge, Zn or Ga), $Li_2S$—$GeS_2$, $Li_2S$—$SiS_2$—$Li_3PO_4$, $Li_2S$—$SiS_2$-$Li_pMO_q$, (where p and q are positive numbers and M is P, Si, Ge, B, Al, Ga, or In), $Li_{7-x}PS_{6-x}Cl_x$, ($0 \leq x \leq 2$), $Li_{7-x}PS_{6-x}Br_x$, ($0 \leq x \leq 2$), or $Li_{7-x}PS_{6-x}I_x$, ($0 \leq x \leq 2$). The solid electrolyte included in the cathode may have the same or different composition as those included in the solid electrolyte layer of an all-solid secondary battery.

In the cathode, based on 100 parts by weight of the total weight of the cathode, the solid electrolyte may be about 5 parts by weight to about 15 parts by weight, the total amount of the positive active material may be about 80 parts by weight to about 90 parts by weight, a conductive material may be about 0.5 parts by weight to about 1 parts by weight, and a binder may be about 1 parts by weight to about 2 parts by weight.

In an implementation, an all-solid secondary battery including the above-described cathode layer, an anode layer, and a sulfide solid electrolyte layer arranged between them, may be provided.

Hereinafter, an all-solid secondary battery according to exemplary embodiments will be described in more detail.

An all-solid secondary battery according to an embodiment may include, e.g., a cathode layer; an anode layer; and a solid electrolyte layer between the cathode layer and the anode layer. The cathode layer may include a positive electrode current collector and a positive active material on the positive electrode current collector, and the anode layer may include a negative electrode current collector and a negative active material on the negative electrode current collector.

The cathode layer may include the cathode according to an embodiment.

[All-Solid Secondary Battery]

Referring to FIG. 1, an all-solid secondary battery 1 may include, e.g., a cathode layer 10; an anode layer 20; and a solid electrolyte layer 30 between the cathode layer 10 and the anode layer 20. The cathode layer 10 may include a positive electrode current collector 11 and a positive active material layer 12 on the positive electrode current collector 11, and the anode layer 20 may include a negative electrode current collector 21 and a negative active material 22 on the negative electrode current collector.

[Cathode Layer: Positive Electrode Current Collector]

For the positive electrode current collector 11, a plate or foil made of, e.g., indium (In), copper (Cu), magnesium (Mg), stainless steel, titanium (Ti), iron (Fe), cobalt (CO), nickel (Ni), zinc (Zn), aluminum (Al), germanium (Ge), lithium (Li), or an alloy thereof, may be used. In an implementation, the positive electrode collector 11 may be omitted.

[Cathode Layer: Positive Active Material]

The positive active material layer 12 may include, e.g., a positive active material and a solid electrolyte. The solid electrolyte included in the cathode layer 10 may be similar to or different from the solid electrolyte included in the solid electrolyte layer 30. For more detailed description of the solid electrolyte, refer to the section of solid electrolyte layer 30.

The positive active material may be a positive active material that can reversibly absorb or desorb lithium ions. The positive active material may include, e.g., a lithium transition metal oxide, such as lithium cobalt oxide (LCO), lithium nickel oxide, lithium nickel cobalt oxide, lithium nickel cobalt aluminum hydroxide (NCA), lithium nickel cobalt manganate (NCM), lithium manganate, or lithium iron phosphate, nickel sulfide, copper sulfide, lithium sulfide, iron oxide, vanadium oxide, or other suitable positive active material. The positive active material may be composed of one positive active material or a mixture of two or more positive active materials.

The lithium transition metal oxide may include, e.g., a compound represented by any one of the formulas $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 < c < 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$ and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where, $0.90 \leq a \leq 1$ and $0.001 \leq b \leq 0.1$); $Li_aMnG_bO_2$ (where $0.90 \leq a \leq 1$, and $0.001 \leq b \leq 0.1$); $Li_aMn_2G_bO_4$ (where $0.90 \leq a \leq 1$ and $0.001 \leq b < 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$. In such a compound, A is Ni, Co, Mn, or a combination thereof, B is Al, Ni, Co, Mn, Cr, Fe, Mg, Sr, V, a rare earth element or a combination thereof, D is O, F, S, P, or a combination thereof, E is Co, Mn, or a combination thereof, F is F, S, P, or a combination thereof, G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; J is V, Cr, Mn, Co, Ni, Cu, or a combination thereof. It is also possible to use a compound having a coating layer added to the surface of the compound, or a mixture of the above-described compound and a compound with a coating layer. The coating layer added to the surface of such a compound may include compounds of a coating element, e.g., oxides of a coating element, hydroxides of a coating element, oxyhydroxides of a coating element, oxycarbonate of a coating element, or hydroxycarbonates of a coating element. The compound that forms such a coating layer may be amorphous or crystalline. A coating element included in the coating layer may include, e.g., Mg, Al, Co, K, Na, Ca, Si, Ti, V, Sn, Ge, Ga, B, As, Zr, or a mixture thereof. A coating layer formation method may be a suitable method that does not adversely affect the physical properties of the positive active material. The coating method may include, e.g., a spray coating, an immersion method, or the like.

The positive active material may include, e.g., a lithium salt of a transition metal oxide which has a layered rock salt type structure among the above-described lithium transition metal oxides. "Layered rock salt type structure" is for example, a structure where oxygen atom layers and metal atom layers are alternately arranged in the direction of <111> of a cubic rock salt type structure, and thereby, each atom layer forms a two-dimensional plane. "Cubic rock salt type structure" is a structure of sodium chloride (NaCl) type which is a kind of a crystal structure, and specifically, face centered cubic (fcc) lattices each formed by cations and anions are displaced from each other by ½ of the ridge of the unit lattice. The lithium transition metal oxide having such a layered rock salt type structure may be, e.g., a three-element lithium transition metal oxide such as $LiNi_xCo_yAl_zO_2$ (NCA) or $LiNi_xCo_yMn_zO_2$ (NCM) ($0<x<1$, $0<y<1$, $0<z<1$, and $x+y+z=1$), or the like. When a positive active material includes a three-element lithium transition metal oxide having a layered rock type structure, the energy density and thermal stability of the all-solid secondary battery 1 may be further improved.

The positive active material may be covered by a coating layer as described above. The coating layer may be a suitable coating layer for a positive active material of an all-solid secondary battery. The coating layer may include, e.g., $Li_2O$—$ZrO_2$ (LZO).

When the positive active material is, e.g., a three-element lithium transition metal oxide such as NCA or NCM and contain nickel (Ni), by increasing the capacity density of the all-solid secondary battery, it is possible to decrease the metal elution of the positive active material in a charging state. As a result, the cycle property of an all-solid secondary battery 1 in a charging state is improved.

The shape of the positive active material may be, e.g., a particle shape such as a true sphere, an elliptical sphere, or the like. The average particle diameter of the positive active material may be in a suitable range applicable to a positive active material. An amount of the positive active material of the cathode layer 10 may be in a suitable range applicable to a cathode.

[Cathode Layer: Solid Electrolyte]

The positive active material layer 12 may include, e.g., a solid electrolyte. A solid electrolyte included in a cathode layer 10 may be the same as or different from a solid electrolyte included in a solid electrolyte layer 30. For a more detailed description of the solid electrolyte, refer to the section for a solid electrolyte layer 30.

The solid electrolyte included in the positive active material layer 12 may have a smaller average particle diameter (D50) compared to the solid electrolyte included in the solid electrolyte layer 30. In an implementation, the average particle diameter of the solid electrolyte included in the positive active material layer 12 may be, e.g., compared to the average particle diameter of the solid electrolyte included in the solid electrolyte layer 30, about 90% or less, about 80% or less, about 70% or less, about 60% or less, about 50% or less, about 40% or less, about 30% or less, or about 20% or less.

[Cathode Layer: Binder]

The positive active material layer 12 may include a binder. In an implementation, the binder may include, e.g., styrene butadiene rubber (SBR), polytetrafluoroethylene, polyvinylidene fluoride, polyethylene, vinylidenfluoride/hexafluoropropylene copolymer, polyacrylonitrile, polymethyl methacrylate, carboxymethyl cellulose, or other suitable binder. The binder may be composed of one binder or multiple different binders.

[Cathode Layer: Conductive Material]

The positive active material layer 12 may include a conductive material. The conductive material may include, e.g., graphite, carbon black, acetylene black, ketjen black, carbon fiber, or metal powder.

[Cathode Layer: Other Additives]

The cathode layer 10 may further include an additive such as a filler, a coating material, a dispersant, an ion conductivity supplement, or the like, besides the above-described positive active material, the solid electrolyte, the binder, and the conductive material.

As a filler, a coating material, a dispersant, an ion conductivity supplement, or the like that may be included in the cathode layer 10.

In a cathode, an amount of the positive active material may be, e.g., about 80 parts by weight to about 93 parts by weight, an amount of the solid electrolyte may be, e.g., about 5 parts by weight to about 10 parts by weight, an amount of the conductive material may be, e.g., about 0.5 parts by weight to about 5 parts by weight, e.g., about 0.5 parts by weight to about 1 parts by weight, and an amount of the binder is about 0.1 parts by weight to about 5 parts by weight, for example, about 0.1 parts by weight to about 2 parts by weight. Here, each amount of the positive active material, solid electrolyte, binder, and the conductive material is based on 100 parts by weight of the cathode.

The thickness of the cathode may be, e.g., about 70 µm to about 150 µm.

[Solid Electrolyte Layer]

[Solid Electrolyte Layer: Sulfide Solid Electrolyte]

Figure 2:
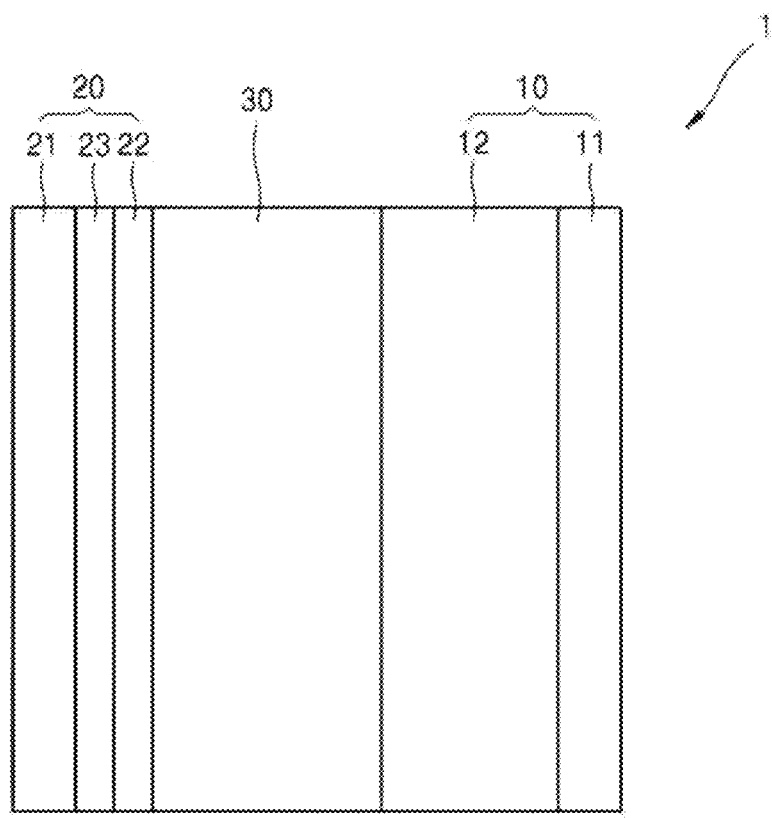
FIG. 2 is a structure of an all-solid secondary battery according to another embodiment.
Figure 3:
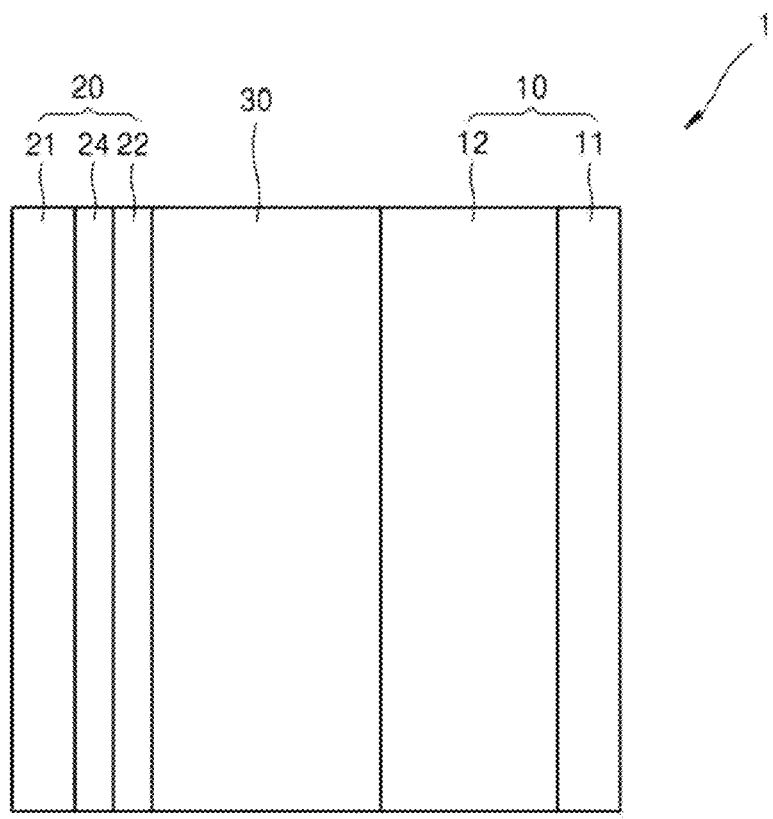
FIG. 3 is a structure of an all-solid secondary battery according to still another embodiment.

Referring to FIGS. 1 to 3, the solid electrolyte layer 30 may include a sulfide solid electrolyte between the cathode layer 10 and the anode layer 20.

The sulfide solid electrolyte may include, e.g., $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, (where m and n are positive numbers, and Z is Ge, Zn, or Ga), $Li_2S$—$GeS_2$, $Li_2S$—$SiS_2$—$Li_3PO_4$, $Li_2S$—$SiS_2$-$Li_pMO_q$ (where p and q are positive numbers, and M is P, Si, Ge, B, Al, Ga, or In), $Li_{7-x}PS_{6-x}Cl_x$ (0≤x≤2), $Li_{7-x}PS_{6-x}Br_x$ (0≤x≤2), and $Li_{7-x}PS_{6-x}I_x$ (0≤x≤2). The sulfide solid electrolyte may be prepared by, e.g., treating a raw material such as $Li_2S$ or $P_2S_5$ by melt quenching or mechanical milling method.

In an implementation, $Li_2S$—$P_2S_5$—LiX may be, e.g., $Li_2S$—$P_2S_5$—LiCl, or $Li_2S$—$P_2S_5$—LiCl—LiBr.

In an implementation, after this treatment, heat treatment may be performed. The solid electrolyte may be in an amorphous state, a crystalline state or, in a mixed state of these. In an implementation, the solid electrolyte, e.g., may include at least as constituent elements, sulfur (S), phosphorus (P), and lithium (Li) among the above-described sulfide solid electrolyte materials. In an implementation, the solid electrolyte may be a material including $Li_2S$—$P_2S_5$. When a compound that includes $Li_2S$—$P_2S_5$ is use as a sulfide solid electrolyte material that forms a solid electrolyte, a molar ratio of $Li_2S$ and $P_2S_5$ for mixing may be, e.g., in the range of $Li_2S$:$P_2S_5$=about 50:50 to about 90:10.

The sulfide solid electrolyte, e.g., may be an argyrodite-type compound including $Li_{7-x}PS_{6-x}Cl_x$, (0≤x≤2), $Li_{7-x}PS_{6-x}Br_x$, (0≤x≤2), or $Li_{7-x}PS_{6-x}I_x$, (0≤x≤2). In an implementation, the sulfide solid electrolyte may be an argyrodite-type compound including, e.g., $Li_6PS_5Cl$, $Li_6PS_5Br$, or $Li_6PS_5I$.

A density of the argyrodite-type solid electrolyte may be about 1.5 g/cc to about 2.0 g/cc. As the argyrodite-type solid electrolyte has a density of about 1.5 g/cc or more, the internal resistance of the all-solid secondary battery may be decreased, and the penetration of a solid electrolyte layer by Li may be effectively suppressed.

An elastic coefficient of the solid electrolyte may be, e.g., about 15 GPa to about 35 GPa.

[Solid Electrolyte Layer: Binder]

The solid electrolyte layer may include, e.g., a binder. A binder included in the solid electrolyte layer 30 may include, e.g., styrene butadiene rubber (SBR), polytetrafluoroethylene, polyvinylidene fluoride, polyethylene, or other suitable binder. The binder in the solid electrolyte layer 30 may be the same as or different from the binder included in the positive active material layer 12 and the negative active material layer 22.

The solid electrolyte layer may have a thickness of, e.g., about 30 µm to about 60 µm.

[Anode Layer]

[Anode Layer: Negative Active Material]

The primary negative active material layer 22 may include, e.g., a negative active material and a binder.

The negative active material included in the primary negative active material layer 22 may be in, e.g., a particle form. The average particle diameter of the negative active material in the particle form may be, e.g., about 4 µm or less, about 3 µm or less, about 2 µm or less, about 1 µm or less, or about 900 nm or less. The average particle diameter of the negative active material in the particle form may be, e.g., about 10 nm to about 4 µm, about 10 nm to about 3 µm, about 10 nm to about 2 µm or less, about 10 nm to about 1 µm, or about 10 nm to about 900 nm. The reversible absorption and/or desorption of lithium at the time of charge/discharge may be facilitated when the negative active material has the average particle diameter in these range. The average particle diameter of the negative active material may be, e.g., a median diameter (D50) measured using a laser particle size distribution device.

The negative active material included in the primary negative active material layer 22 may include, e.g., a carbon negative active material, a metal negative active material, or a metalloid negative active material.

The carbon negative active material may include, e.g., amorphous carbon. Amorphous carbon may include, e.g., carbon black (CB), acetylene black (AB), furnace black (FB), ketjen black (KB), graphene, or other suitable amorphous carbon. Amorphous carbon has a very low or no crystallinity and is distinguished from crystalline carbon or graphite carbon.

The metal or metalloid negative active material may include, e.g., gold (Au), platinum (Pt), palladium (Pd), silicon (Si), silver (Ag), aluminum (Al), bismuth (Bi), tin (Sn), zinc (Zn), or other suitable material. In an implementation, nickel (Ni) is not a negative active material because it does not form alloys with lithium.

The primary negative active material layer 22 may include one kind of a negative active material, or a mixture of multiple different negative active materials. In an implementation, the primary negative active material layer 22 may include amorphous carbon alone, or gold (Au), platinum (Pt), palladium (Pd), silicon (Si), silver (Ag), aluminum (Al), bismuth (Bi), tin (Sn), or zinc (Zn). In an implementation, the primary negative active material layer 22 may include a mixture of amorphous carbon and gold (Au), platinum (Pt), palladium (Pd), silicon (Si), silver (Ag), aluminum (Al), bismuth (Bi), tin (Sn), or zinc (Zn). In an implementation, a mixing ratio of the mixture of amorphous carbon and gold or the like may be, e.g., about 10:1 to about 1:2, about 5:1 to about 1:1, or about 4:1 to about 2:1, or other suitable ratio selected according to the properties of the all-solid secondary battery 1. In the negative active material having such a composition, the cycle property of the all-solid secondary battery 1 may be further improved.

The negative active material included in the primary negative active material layer 22 may include, e.g., a mixture of primary particles made of amorphous carbon and secondary particles made of a metal or a metalloid. In an implementation, the metal or metalloid may include, e.g., gold (Au), platinum (Pt), palladium (Pd), silicon (Si), silver (Ag), aluminum (Al), bismuth (Bi), tin (Sn), or zinc (Zn). In an implementation, the metalloid may be, e.g., a semiconductor. An amount of the secondary particle may be, e.g., based on the total weight of the mixture, about 8 wt % to about 60 wt %, about 10 wt % to about 50 wt %, about 15 wt % to about 40 wt %, or about 20 wt % to about 30 wt %. The amount of the secondary particle may be in the range and, e.g., the cycle property of the all-solid secondary battery 1 may be further improved.

[Anode Layer: Binder]

The binder included in the primary negative active material layer 22 may include, e.g., styrene-butadiene rubber (SBR), polytetrafluoroethylene, polyvinylhylidene fluoride, polyethylene, vinylidene fluoride/hexafluoropropylene copolymers, polyacrylonitrile, polymethyl methacrylate, carboxymethyl cellulose, or other suitable binder. The binder may be composed of one binder or multiple different binders.

The primary negative active material layer 22 may include the binder, and the primary negative active material layer 22 may be stabilized on the negative electrode current collector 21. Further, in the charge/discharge process, despite the volume change and/or relative position change of the primary negative active material layer 22, the cracking of the primary negative active material layer 22 may be suppressed. If the primary negative active material layer 22 were to not include a binder, it would be possible to easily separate the primary negative active material layer 22 from the negative electrode current collector 21. In the portion of the primary negative active material layer 22 disengaged from the negative electrode current collector 21, the negative electrode current collector 21 may be exposed and contacts the solid electrolyte layer 30, and a short circuit would be more likely to occur. The primary negative active material layer 22 may be prepared by, e.g., applying a slurry where materials that make up the primary negative active material layer 22 are dispersed, on the negative electrode current collector 21, and drying it. By including a binder in the primary negative active material layer 22, the negative active material in the slurry may be dispersed stably. In an implementation, when the slurry is applied on the negative electrode current collector 21 by a screen printing method, it is possible to help suppress the clogging of the screen (e.g., clogging by agglomerates of the negative active material).

[Anode Layer: Other Additives]

The primary negative active material layer 22 may further include an additive for an all-solid secondary battery, e.g., a filler, a coating material, a dispersant, an ion conductivity supplement, or the like.

[Anode Layer: Primary Negative Active Material Layer]

A thickness of the primary negative active material layer 22 may be, e.g., about 50% or less, about 40% or less, about 30% or less, about 20% or less, about 10% or less, or about 5% or less of the thickness of the positive active material layer. The thickness of the primary negative active material layer 22 may be, e.g., about 1 µm to about 20 µm, about 2 µm to about 10 µm, or about 3 µm to about 7 µm. If the primary negative active material layer 22 were to be excessively thin, lithium dendrite formed between the primary negative active material layer 22 and the negative electrode current collector 21 could collapse the primary negative active material layer 22, and the cycle property of the all-solid secondary battery 1 could be difficult to improve. If the thickness of the primary negative active material layer 22 were to be excessively increased, the energy density of the all-solid secondary battery 1 could be lowered, the internal resistance of the all-solid secondary battery 1 could be increased by the primary negative active material layer 22, and the cycle property of the all-solid secondary battery 1 could be difficult to improve.

If the thickness of the primary negative active material layer 22 were to be reduced, e.g., the charge capacity of the primary negative active material layer 22 could also be reduced. The charge capacity of the primary negative active material layer 22 may be, e.g., about 50% or less, about 40% or less, about 30% or less, about 20% or less, about 10% or less, about 5% or less, or about 2% or less, compared to the charge capacity of the positive active material layer 12. The charge capacity of the primary negative active material layer 22 may be, e.g., about 0.1% to about 50%, about 0.1% to about 40%, about 0.1% to about 30%, about 0.1% to about 20%, about 0.1% to about 10%, about 0.1% to about 5%, or about 0.1% to about 2%, of the charge capacity of the positive active material layer 12. If the charge capacity of the primary negative active material layer 22 were to be excessively small, the primary negative active material layer 22 could become very thin, and the lithium dendrite formed between the primary negative active material layer 22 and the negative electrode current collector 21 in the repeated charge/discharge processes, could collapse the primary negative active material layer 22 and the cycle property of the all-solid secondary battery 1 could be difficult to improve. If the charge capacity of the primary negative active material layer 22 were to be excessively increased, the energy density of the all-solid secondary battery 1 could be lowered, the internal resistance of the all-solid secondary battery 1 could be increased by the primary negative active material layer 22, and the cycle property of the all-solid secondary battery 1 could be difficult to improve.

The charge capacity of the positive active material layer 12 is obtained by multiplying the charge capacity density (mAh/g) of the positive active material to the mass of the positive active material of the positive active material layer 12. When different kinds of positive active materials are used, the value of charge capacity density×mass is calculated for each positive active material, and the total sum of the value is the charge capacity of the positive active material layer 12. The charge capacity of the primary negative active material layer 22 is calculated in the same way. In other words, the charge capacity of the primary negative active material layer 22 is obtained by multiplying the charge capacity density (mAh/g) of the negative active material to the mass of the negative active material of the primary negative active material layer 22. When different kinds of negative active materials are used, the value of charge capacity density×mass is calculated for each negative active material, and the total sum of the value is the capacity of the primary negative active material layer 22. Here, the charge capacity density of the positive active material and the negative active material is estimated by using an all-solid half-cell that uses lithium metal as a relative electrode. The charge capacity of the positive active material layer 12 and the primary negative active material layer 22 is directly measured by using the charge capacity measurement using an all-solid half-cell. Charge capacity density is obtained by dividing the measured charge capacity by the mass of each active material. Alternatively, the charge capacity of the positive active material layer 12 and the primary negative active material layer 22 may be the initial charge capacity measured at the first cycle.

[Anode Layer: Secondary Negative Active Material Layer 23 (Eduction Layer)]

Referring to FIG. 2, the all-solid secondary battery 1 may further include by charging, e.g., the secondary negative active material layer 23 between the negative electrode current collector 21 and the primary negative active material layer 22. By charging, the all-solid secondary battery 1 may further include the secondary negative active material layer 23 between the solid electrolyte layer 30 and the primary negative active material layer 22. The all-solid secondary battery 1 may further include the secondary negative active material layer 23, e.g., between the negative electrode current collector 21 and the primary negative active material layer 22 and between the solid electrolyte layer 30 and the primary negative active material layer 22. The secondary negative active material layer 23 may be a metal layer including lithium or a lithium alloy. The metal layer may include lithium or lithium alloy. The secondary negative active material layer 23 may be a metal layer including lithium, and may act as a lithium reservoir. The lithium alloy may include, e.g., Li—Al alloy, Li—Sn alloy, Li—In alloy, Li—Ag alloy, Li—Au alloy, Li—Zn alloy, Li—Ge alloy, Li—Si alloy, or other suitable lithium alloy. The secondary negative active material layer 23 may be made of one of these alloys or lithium or different kinds of alloys.

In an implementation, the thickness of the secondary negative active material layer 23 may be, e.g., about 1 μm to about 1000 μm, about 1 μm to about 500 μm, about 1 μm to about 200 μm, about 1 μm to about 150 μm, about 1 μm to about 100 μm, or about 1 μm to about 50 μm. If the secondary negative active material layer 23 were to be excessively thin, the secondary negative active material 23 could hardly function as a lithium reservoir. If the secondary negative active material layer 23 were to be excessively thick, the mass and volume of the all-solid secondary battery 1 could be increased, and the cycle property could decline. The secondary negative active material layer 23 may be, e.g., a metal foil having a thickness in this range.

In an all-solid secondary battery 1, the secondary negative active material layer 23 may be, e.g., between the negative electrode current collector 21 and the primary negative active material layer 22 before the assembly of the all-solid secondary battery 1 or may be educed by charging, between the negative electrode current collector 21 and the primary negative active material layer 22 after the assembly of the all-solid secondary battery. When the secondary negative active material layer 23 is arranged between the negative electrode current collector 21 and the primary negative active material layer 22 before the assembly of the all-solid secondary battery 1, the secondary negative active material layer 23, as a metal layer including lithium, may act as a lithium reservoir. In an implementation, lithium foil may be disposed between the negative electrode current collector 21 and the primary negative active material layer 22 before the assembly of the all-solid secondary battery 1. As a result, the cycle characteristic of the all-solid secondary battery 1 including the secondary negative active material layer 23 may be further improved.

When the secondary negative active material layer 23 is educed by charging, after the assembly of an all-solid secondary battery, the energy density of the all-solid secondary battery may increase, e.g., because the secondary negative active material layer 23 may not be included at the time the all-solid secondary battery is assembled. In an implementation, when the all-solid secondary battery 1 is charged, it may be charged beyond the charge capacity of the primary negative active material layer 22. In an implementation, the primary negative active material layer 22 may be overcharged. At the beginning of charging, lithium may be occluded in the primary negative active material layer 22. The negative active material included in the primary negative active material layer 22 may form an alloy or a compound with the lithium ion from the cathode layer 10. When the primary negative active material layer 22 is charged beyond its capacity, e.g., at the back surface of the primary negative active material layer 22, or between the negative electrode current collector 21 and the primary negative active material layer 22, lithium may be educed, and a metal layer corresponding to the secondary negative active material layer 23 may be formed by the educed lithium. The secondary negative active material layer 23 may be a metal layer mainly including lithium (e.g., non-compounded or metallic lithium). These results may be obtained when, e.g., the negative active material included in the primary negative active material layer 22 is composed of a substance that forms an alloy or a compound with lithium. When discharged, lithium in the primary negative active material layer 22 and the secondary negative active material layer 23, that are, the metal layer, is ionized and moves in the direction of the cathode layer 10. Therefore, it is possible to use lithium as a negative active material in the all-solid secondary battery 1. In an implementation, as the primary negative active material layer 22 coats the secondary negative active material layer 23, it may function as a protection layer of the secondary negative active material layer 23, e.g., the metal layer, and at the same time, it may help suppress the eduction growth of a lithium dendrite. Therefore, a short circuit occurrence and capacity deterioration of the all-solid secondary battery may be suppressed, and as a result, the cycle characteristic of the all-solid secondary battery may be improved. In an implementation, when the secondary negative active material layer 23 is formed by charging after the assembly of the all-solid secondary battery, the negative electrode current collector 21, the primary negative active material layer 22 and the region between them may be, e.g., Li-free areas where lithium (Li) in not included, in the initial state or the state after the discharge.

[Anode Layer: Tertiary Negative Active Material Layer]

Referring to FIG. 3, an all-solid secondary battery 1 may include a tertiary negative active material layer 24. The tertiary negative active material layer 24 may be a metal layer including lithium or a lithium alloy. The metal layer may include, e.g., lithium or a lithium alloy. The tertiary negative active material layer 24 may be a metal layer including lithium and may act as, e.g., a lithium reservoir. The lithium alloy may include, e.g., Li—Al alloy, Li—Sn alloy, Li—In alloy, Li—Ag alloy, Li—Au alloy, Li—Zn alloy, Li—Ge alloy, Li—Si alloy, or other suitable alloy. The tertiary negative active material layer 24 may be made of one of these alloys or lithium, or alloys of different kinds.

In an implementation, the thickness of the tertiary negative active material layer 24 may be, e.g., about 1 µm to about 100 µm, about 10 µm to about 100 µm, about 1 µm to about 50 µm, about 1 µm to about 40 µm, about 1 µm to about 30 µm, about 1 µm to about 20 µm, about 1 µm to about 15 µm, about 1 µm to about 10 µm, or about 1 µm to about 5 µm. If the thickness of the tertiary negative active material layer 24 were to be excessively thin, the tertiary negative active material layer 24 could be difficult to perform the role as a lithium reservoir. If the tertiary negative active material layer 24 were to be too thick, the mass and volume of the all-solid secondary battery could be increased and the cycle characteristic could be rather degraded. The tertiary negative active material layer 24 may include, e.g., a metal deposition layer or a metal foil having a thickness in this range.

A lithium halide layer may be additionally disposed on the tertiary negative active material layer 24. The lithium halide layer may act as a passivation layer to help prevent deterioration of the tertiary negative active material layer 24. The lithium halide layer is a high-strength and a high-hardness layer and may be a protecting layer protecting the tertiary negative active material layer 24. The lithium halide layer may include, e.g., LiF, LiCl, LiBr, or LiI. The lithium halide layer may be, e.g., a LiF layer. The lithium halide layer may be on the tertiary negative active material layer 24 by deposition. In an implementation, the thickness of the lithium halide layer may be, e.g., about 10 µm to about 300 µm, about 10 µm to about 100 µm, about 10 µm to about 150 µm, about 10 µm to about 100 µm, about 10 µm to about 60 µm, about 10 µm to about 80 µmm, about 10 µm to about 60 µm, or about 20 µm to about 50 µm. If the lithium halide layer were to be too thin, it could be difficult for the lithium halide layer to prevent deterioration of the tertiary negative active material layer 24. If the lithium halide layer were to be too thick, the energy density of the all-solid secondary battery 1 could be lowered.

In an implementation, a carbon layer may be additionally disposed on the lithium halide layer. The carbon layer may be additionally arranged on the lithium halide layer, and the lithium halide layer may decrease the interfacial resistance between the solid electrolyte layers 30. The thickness of the carbon layer may be, e.g., about 1 µm to about 10 µm, about 2 µm to about 10 µm, or about 1 µm to about 5 µm. If the carbon layer were to be too thin, it could be difficult to effectively reduce the interfacial resistance between the lithium halide layer and the solid electrolyte layer 30. If the carbon layer were to be too thick, the energy density of the all-solid secondary battery 1 may be decreased. The carbon layer may include a binder and a carbon material. The carbon material may include, e.g., amorphous carbon, crystalline carbon, or the like. The binder may include a binder used in the above-described cathode layer. The carbon layer may include both amorphous carbon and crystalline carbon. The weight ratio of amorphous carbon and crystalline carbon included in the carbon layer may be, e.g., about 4:6 to about 6:4.

[Anode Layer: Negative Electrode Current Collector]

The negative electrode current collector 21 may include a material that does not react with lithium, e.g., that does not form alloys and compounds with lithium. The material constituting the negative electrode current collector 21 may include, e.g., copper (Cu), stainless steel, titanium (Ti), iron (Fe), cobalt (Co), nickel (Ni), or the like. The negative electrode current collector 21 may include one the above-described metals, or an alloy of two or more metals or a coating material. The negative electrode current collector 21 may be, e.g., a plate-like or foil form.

The all-solid secondary battery 1 may further include a thin film including an element capable of forming an alloy with lithium on, e.g., the negative electrode current collector 21. The thin film may be between the negative electrode current collector 21 and the primary negative active material layer 22. The thin film may include, e.g., an element capable of forming alloys with lithium. Elements capable of forming alloys with lithium may include, e.g., gold, silver, zinc, tin, indium, silicon, aluminum, bismuth, or the like. The thin film may be composed of one of these metals, or may be composed of an alloy of various kinds of metals. The thin film may be on the negative electrode current collector 21, e.g., and the eduction shape of the secondary negative active material layer 23 may be more flattened, wherein the secondary negative active material layer 23 is educed between the thin layer 24 and the primary negative active material layer 22, and the cycle characteristic of the solid secondary battery 1 may be further improved.

The thickness of the thin film may be, e.g., about 1 nm to about 800 nm, about 10 nm to about 700 nm, about 50 nm to about 600 nm, or about 100 nm to about 500 nm. If the thickness of the thin film were to be less than about 1 nm, the function of the thin film could be difficult to be exhibited. If the thickness of the thin film were to be too high, the thin film itself could occlude lithium and the amount of the educed lithium at the anode may be decreased, thereby reducing the energy density of the all-solid-state battery, and the cycle characteristic of the all-solid secondary battery 1 may be declined. The thin film may be formed on the negative electrode current collector 21 by, e.g., a vacuum deposition method, a sputtering method, a plating method, or other suitable method.

An all-solid secondary battery according to an embodiment may be applicable to a medium to large sized battery or an energy storage system (ESS). An all-solid secondary battery according to an embodiment, e.g., may be used in a vehicle fuel cell.

Next, a manufacturing method of an all-solid secondary battery that applies a cathode including the above-described positive active material will be described.

First, a composition for forming a positive active material layer may be prepared by mixing the positive active material, the binder, the solid electrolyte, the conductive material, and a solvent.

The composition for forming the above-described positive active material layer may be coated on the positive electrode current collector and dried to form a positive active material layer and thereby a cathode layer may be provided.

The drying may be carried out at a temperature of about 40° C. to about 60° C.

In an implementation, the method may include providing an anode layer including the negative electrode current collector and a primary negative active material layer; preparing a laminate by providing a solid electrolyte between the anode layer and the cathode layer; and pressing the laminate.

Pressurization may be carried out at a temperature of about 25° C. to about 90° C., and the pressure may be about 550 MPa or less, e.g., about 500 MPa or less or about 400 MPa to about 500 MPa to complete the all-solid secondary battery. The pressing time may vary depending on the temperature and pressure and may be, e.g., less than about 30 minutes. The pressurization may use, e.g., an isostatic press, roll press, or a plate press.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of a Positive Active Material)

Preparation Example

First, a Ni-Rich NCM active material was prepared by the following method.

A nickel active material precursor $(Ni_{0.90}Co_{0.07}Mn_{0.03}(OH)_2)$ was synthesized by a co-precipitation method as follows. As a metal raw material for forming a nickel active material precursor in the following manufacturing process, nickel sulfate $(NiSO_4.6H_2O)$, cobalt sulfate $(CoSO_4.7H_2O)$ and manganese sulfate $(MnSO_4.H_2O)$ were used. Ammonia (having a concentration of 0.35 mol/L) was added to the reactor, and the reaction was started at a stirring speed of 250 rpm and a reaction temperature of 50° C. Here, the metal materials were added in at a speed of 6.00 L/hr and ammonia at 0.6 L/hr simultaneously, and NaOH was added for pH control. At this time, the pH of the reactor was adjusted to be pH 11.3 to pH 11.4. The reaction was carried out for 33 hours and the reaction product was collected. The product was washed, and a hot air drying was performed at 150° C. for 24 hours, and a nickel active material precursor $(Ni_{0.90}Co_{0.07}Mn_{0.03}(OH)_2)$ was prepared. The active material precursor was then mixed with lithium at a molar ratio of 1:1, and heat treated at about 750° C. for 10 hours and the active material $Li_{1.0}Ni_{0.90}Co_{0.07}Mn_{0.03}O_2$ (Ni-rich NCM) was obtained.

$CuCl_2$ and $LiOH\ H_2O$ were added to ethanol and stirred and mixed at ambient temperature for 30 minutes to prepare a coating solution. Here, based on 100 mol % of the Ni-rich NCM active material, an amount of $CuCl_2$ was 0.005 mol %, and an amount of $LiOH\ H_2O$ was 1.0 mol %.

The coating solution and the fine powder of the active material $Li_{1.0}Ni_{0.90}Co_{0.07}Mn_{0.03}O_2$(Ni-rich NCM) were mixed in equal weight parts, and as the mixed solution was stirred, it was heated at 150° C. for at least 2 hours to evaporate the alcohol solvent. The process was carried out to deposit residual lithium (such as lithium carbonate, lithium hydroxide, or the like) on particle surfaces of the positive active material fine powder.

The positive active material was then heat-treated under an oxygen atmosphere for 4 hours at about 300° C. Through this heat treatment process, $LiCuCl_2$ and residual lithium that existed on the positive active material converted to a buffer layer of which main components were $Li_x$—$Cu_y$—$Cl_z$ ($0 \leq x \leq 3$, $1 \leq y \leq 5$, and $1 \leq z \leq 5$) and $Li_2O$, and finally, on the surface of Ni-rich NCM particles, a positive active material coated with lithium-Cu-halide was obtained.

Preparation Example 2

A positive active material was obtained by performing the same process as in Preparation Example 1, except that the amount of $CuCl_2$ was changed to be 0.01 mol %, based on 100 mol % of the Ni-rich-NCM active material.

Preparation Example 3

A positive active material was obtained by performing the same process as in Preparation Example 1, except that an amount of $CuCl_2$ was changed to be 0.0025 mol %, based on 100 mol % of the Ni-rich-NCM active material.

Preparation Example 4

A positive active material was obtained by performing the same process as in Preparation Example 1, except that the amount of $CuCl_2$ was changed to be 0.05 mol %, based on 100 mol % of the Ni-rich-NCM active material.

Preparation Example 5

A positive active material was obtained by performing the same process as in Preparation Example 1, except that the amount of $CuCl_2$ was changed to be 0.1 mol %, based on 100 mol % of the Ni-rich-NCM active material.

Preparation Example 6

A positive active material was obtained by performing the same process as in Preparation Example 1, except that the amount of $CuCl_2$ was changed to be 0.2 mol %, based on 100 mol % of the Ni-rich-NCM active material.

Preparation Example 7

A positive active material was obtained by performing the same process as in Preparation Example 1, except that the amount of $CuCl_2$ was changed to be 0.0005 mol %, based on 100 mol % of the Ni-rich-NCM active material.

Preparation Example 8

A positive active material was obtained by performing the same process as in Preparation Example 1, except that the amount of $CuCl_2$ was changed to be 0.001 mol %, based on 100 mol % of the Ni-rich-NCM active material.

Preparation Example 9

A positive active material was obtained by performing the same process as in Preparation Example 1, except that the amount of $CuCl_2$ was changed to be 0.003 mol %, based on 100 mol % of the Ni-rich-NCM active material.

Comparative Preparation Example 1

As the positive active material, an active material $Li_{1.00}Ni_{0.90}Co_{0.07}Mn_{0.03}O_2$(Ni-rich NCM) in a state that did not form a $Li_x$—$Cu_y$—$Cl_z$ buffer layer was used.

(Preparation of all-Solid Secondary Battery)

Example 1

As the positive active material, the positive active material obtained according to Preparation Example 1 was used, as a solid electrolyte, an azrodite solid electrolyte ($Li_6PS_5Cl$) (D50=1 μm, crystalline) was used, and as a conductive material, carbon nano fiber (CNF) was used. These materials were mixed at a weight ratio of positive active material:conductive material:solid electrolyte=60 wt %:5 wt %:35 wt %.

Li metal of thickness 40 μm was used as an anode.

The composition in which the positive active material, solid electrolyte, and carbon nano fiber were mixed at a weight ratio of 60 wt %:35 wt %:5 wt % was homogeneously distributed on a solid electrolyte filled at a torque cell having a 13 mm diameter. The solid electrolyte was hand pressed in the first filling, and after the prepared cathode mixture was put on the solid electrolyte layer, it was plated pressed for 2 minutes at a pressure of 4 tons per unit area to make a torque cell of anode/solid electrolyte/cathode structure. The pressing force of the torque cell was concluded at 4 N·m torque pressure.

Examples 2 to 9

An all-solid secondary battery was prepared by performing the same processes as in Example 1, except that in a cathode preparation, positive active materials of Preparation Examples 2 to 9 were used respectively instead of the positive active material of Preparation Example 1.

Comparative Example 1

An all-solid secondary battery was prepared by performing the same processes as in Example 1, except that in a cathode preparation, the positive active material of Comparative Preparation Example 1 was used in place of the positive active material of Preparation Example 1.

Evaluation Example 1: Measurement of Impedance

The resistance was measured at 45° C., according to a 2-probe method using an impedance analyzer (Solartron 1260A Impedance/Gain-Phase Analyzer) for the all-solid secondary battery prepared according to Examples 1 to 3 and Comparative Example 1. The amplitude was +10 mV and the frequency range was 10 mHz to 1 MHz.

Figure 4:
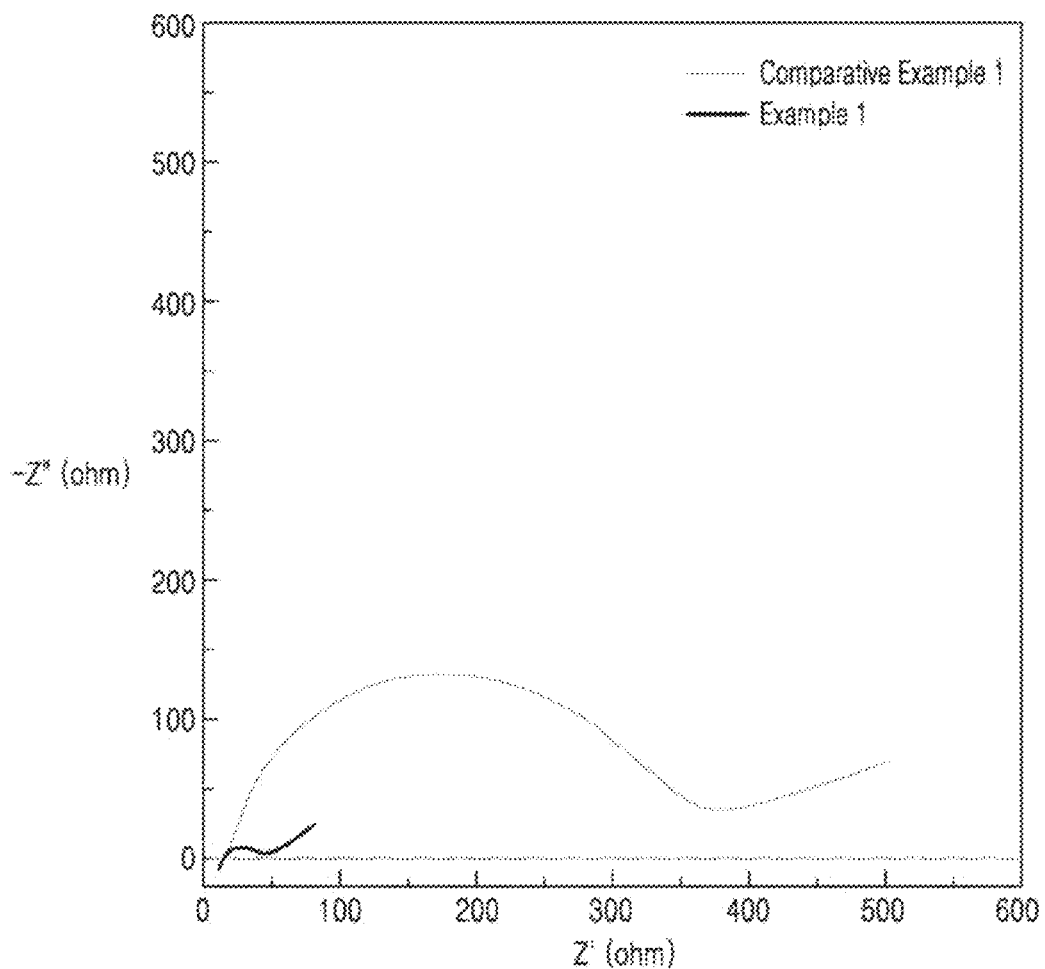
FIG. 4 is an impedance measurement result of the all-solid secondary batteries prepared according to Example 1 and Comparative Example 1.

The all-solid secondary batteries prepared according to Example 1 and Comparative Example 1 were charged to a state of charge (SOC) 100 at 0.1 C-rate under the condition of 4.25V CCCV/CC, and after an hour of stabilization time, the impedance was measured, and a Nyquist plot of the result is shown in FIG. 4. In FIG. 4, the interfacial resistance of the electrode is determined by the position and size of a semicircle. Multiple semicircles are fitted on the measured profile, and the difference between the left X-axis intercept and the right X-axis intercept of the semicircle is calculated, and the interfacial resistance in the electrode is obtained.

As shown in FIG. 4, it may be seen that the interfacial resistance of the all-solid secondary batteries prepared according to Examples 1 to 3 was, compared to that of the all-solid secondary battery prepared according to Comparative Example 1, significantly reduced by the formation of a buffer layer.

Figure 5:
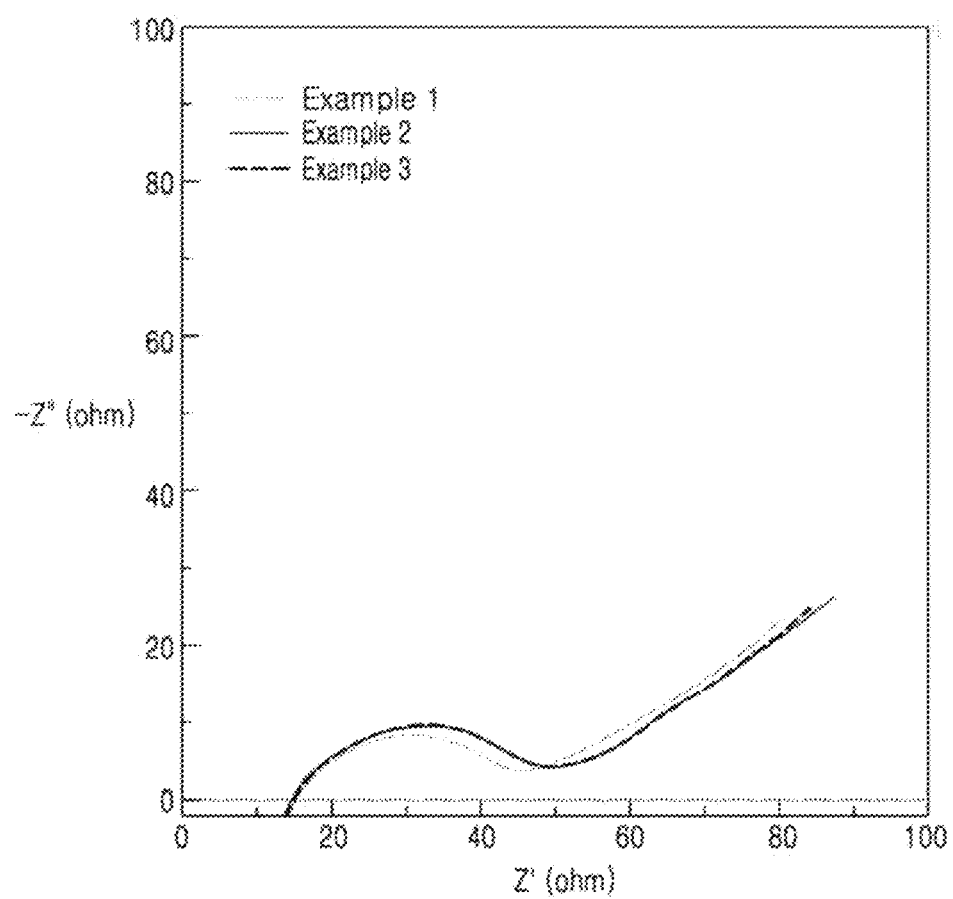
FIG. 5 is an impedance measurement result of the all-solid secondary batteries prepared according to Examples 1 to 3.

The impedance measurement results of the all-solid secondary batteries of Examples 1 to 3 are shown in FIG. 5. As shown in FIG. 5, when interfacial resistances according to varying contents of $CuCl_2$ are compared, it may be seen that the lower the content, the better the Ra (interfacial resistance) of the buffer layer formed.

The $R_{ct}$ (interfacial resistance) values of Examples 1 to 3 and Comparative Example 1 are shown in Table 1 below.

TABLE 1

| Type | $R_{ct}$ |
| --- | --- |
| Comparative Example 1 | 332.1 |
| Example 1 | 31.4 |
| Example 2 | 35.1 |
| Example 3 | 34.6 |

Evaluation Example 2: Discharge Rate Characteristic and Recovery Capacity Measurement A charge/discharge at a constant current rate was performed on the all-solid secondary batteries prepared according to Examples 1 to 3 and Comparative Example 1 by charging them at 0.1 C-rate under the condition of 4.25V CCCV/CC, and discharging them at each rate of 0.1 C-rate, 0.33 C-rate, and 1.0 C-rate.

Figure 6:
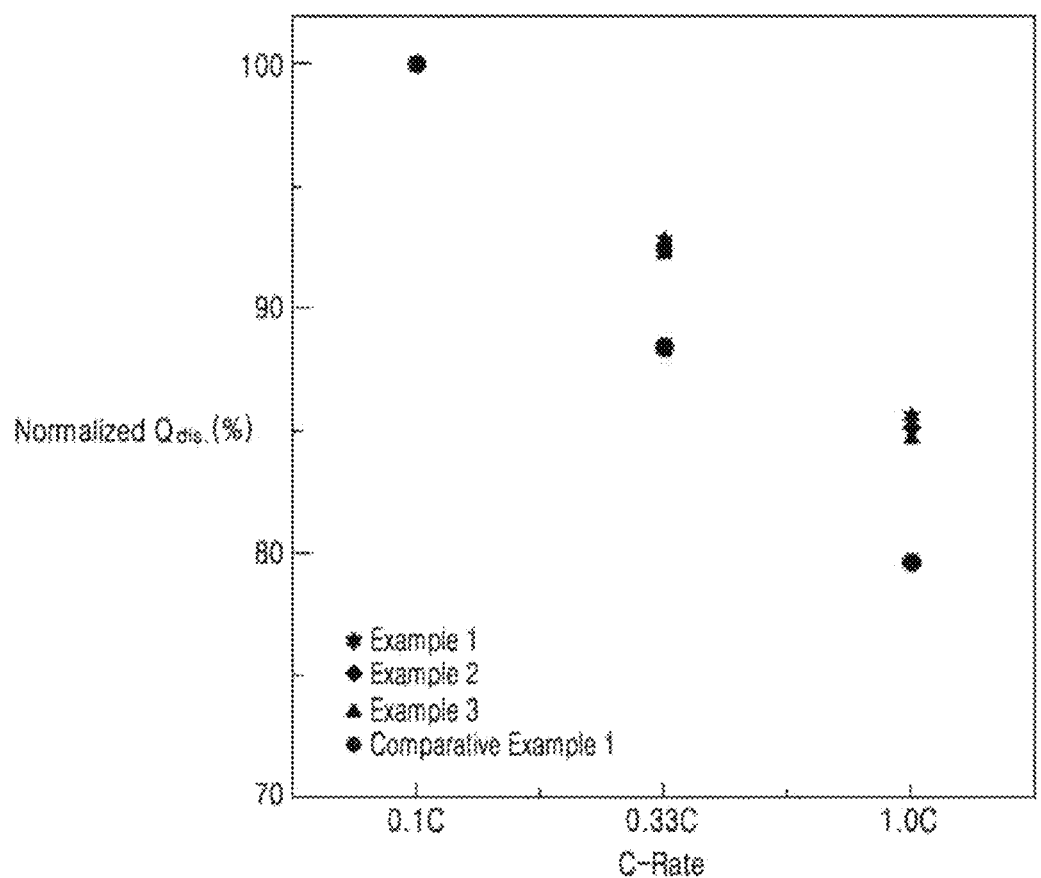
FIG. 6 is a recovery capacity measurement result of the all-solid secondary batteries prepared according to Examples 1 to 3, and Comparative Example 1.

FIG. 6 is a graph showing the property at a high rate discharge, and the all-solid secondary batteries of Examples 1 to 3 showed a better discharge rate property compared to Comparative Example 1 (which did not include a buffer layer). Afterwards, a low rate charge/discharge was performed at 0.1 C-rate, and the discharge recovery capacity was measured in each case, and the results are shown in Table 2.

TABLE 2

| Type | Recovery Rate (mAh/g) |
| --- | --- |
| Comparative Example 1 | 180.0 |
| Example 1 | 195.5 |
| Example 2 | 192.4 |
| Example 3 | 189.8 |

As shown in Table 2, after a high rate (1.0 C) discharge, it nay be seen that the all-solid secondary batteries of Examples 1 to 3, in which a buffer layer was formed, showed a better recovery capacity property than Comparative Example 1 (which did not include a buffer layer).

Evaluation Example 3: Lifetime Characteristic

The charge/discharge characteristic of the all-solid secondary batteries prepared according to Example 1 and Comparative Example 1 were evaluated by a charge/discharge device (manufacturer: TOYO, model: TOYO-3100).

For the initial charge/discharge, a battery was charged at the constant current of 0.1 C until the voltage reached 4.25 V, and then it was charged at the constant voltage until the current reached 0.05 C. After the charge was completed in a cell, there was a rest period of about 10 minutes, and it was discharged at the constant current of 0.1 C until the voltage reached 2.5 V.

For the evaluation of the lifetime characteristic, it was charged at the constant current of 1 C until the voltage reached 4.25 V, and then it was charged at the constant voltage until the current reached 0.05 C. After the charge was completed in a cell, there was a rest period of about 10 minutes, and then it was discharged at the constant current of 1 C until the voltage reached 2.5 V; the cycle was repeatedly performed for 50 times to evaluate.

Figure 7:
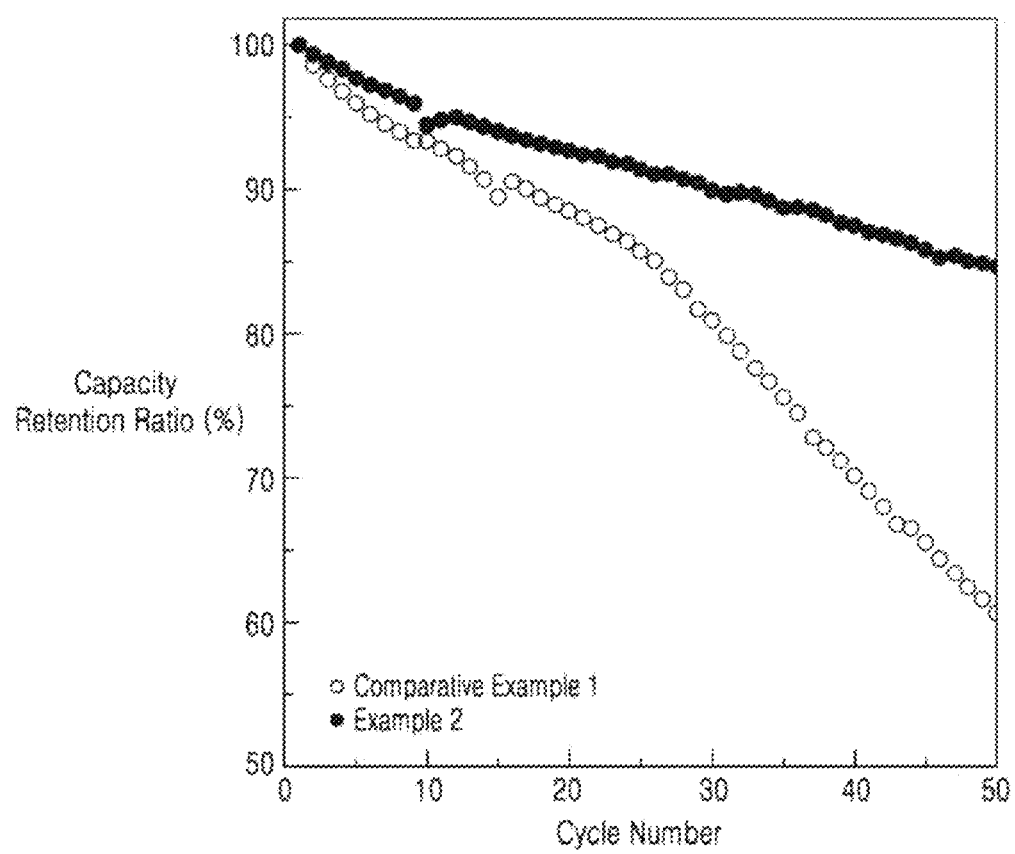
FIG. 7 is a result of lifespan characteristic evaluation of the all-solid secondary batteries prepared according to Example 1 and Comparative Example 1.

The capacity retention ratio (CRR) was calculated from the following Equation 1, and the capacity retention rate evaluation results are shown in FIG. 7.

Capacity retention rate (lifetime) [%]=[discharge capacity of each cycle/discharge capacity of the 1st cycle]×100    [Equation 1]

As shown in FIG. 7, it may be seen that the all-solid secondary battery prepared according to Example 1 had a remarkably improved capacity retention rate, compared to Comparative Example 1.

Evaluation Example 4: Cyclic Voltammetry Analysis

Figure 8:
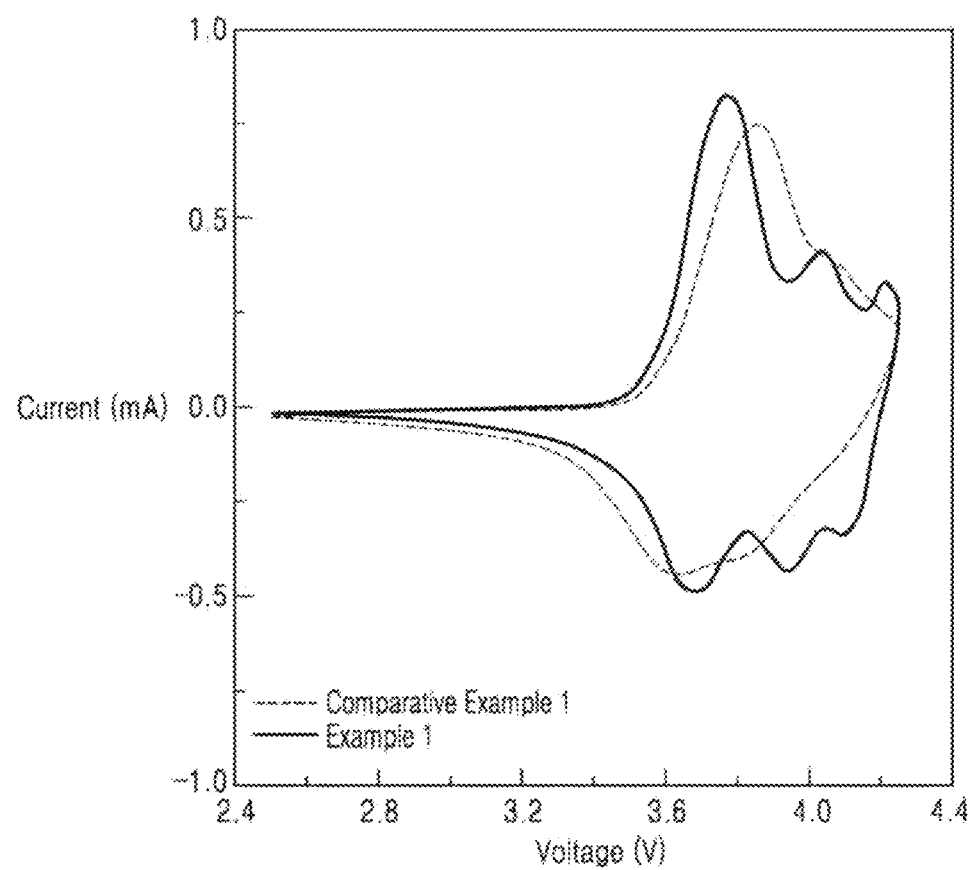
FIG. 8 is a result of cyclic voltammetry analysis showing irreversibility properties of the cathodes according to Example 1 and Comparative Example 1.

In order to identify the irreversible properties of the cathode according to Example 1 and Comparative Example 1, the cathode was used as a working electrode, and lithium metal was used as a reference electrode and a relative (counter) electrode, and a cyclic voltammetry analysis was performed at 45° C. at the speed of 0.05 mV/s from 2.5 V to 4.25 V, and the results are shown in FIG. 8.

In FIG. 8, the graph of Comparative Example 1 shows a larger inhibited area than the graph of Example 1, wherein the large inhibited area indicates large irreversibility. As shown in FIG. 8, the cathode of Example 1 showed a starting voltage shift to a higher voltage according to the Cu content, and had more reversible lithium ions because irreversibility is suppressed compared to Comparative Example 1.

Evaluation Example 5: High Voltage Stability Evaluation

In order to assess the high voltage stability of the positive active materials of Example 1 and Comparative Example 1, an electrochemical evaluation was conducted at 45° C. on the all-solid secondary batteries prepared according to Example 1 and Comparative Example 1 with each positive active material applied.

First, for a theoretical capacity, it was charged at a constant current of 0.1 C rate until the voltage reached 4.25 V which is the maximum voltage of the anode, and then it was charged at the constant voltage until the current reached 0.05 C rate, cut off, and there was a rest period of 1 hour. Then, the resistance was measured at 45° C. according to the 2-probe method using an impedance analyzer in an equilibrium voltage state. The amplitude was ±10 mV and the frequency range was 10 mHz to 1 MHz. In the same way as above, the cell was charged at the constant current of 0.1 C rate until the voltage reached 4.25 V, and a constant voltage state was maintained for 12 hours, and there was an hour of rest period. In the same way, the resistance was repeatedly measured at intervals of 12 hours up to 60 hours, and the interfacial resistance was calculated from a Nyquist plot of the measurement.

Figure 9:
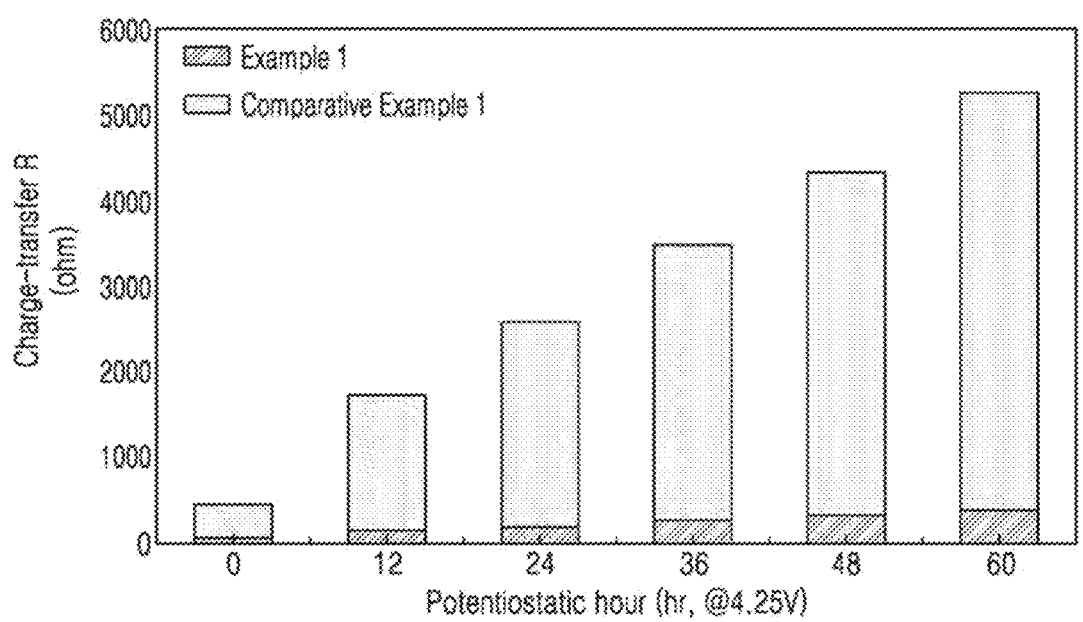
FIG. 9 is a result of high voltage stability evaluation of the all-solid secondary batteries prepared according to Example 1 and Comparative Example 1.

As shown in FIG. 9, the interfacial resistance of the all-solid secondary battery of Example 1 increased gradually, due to the formation of a buffer layer, compared to the Comparative Example 1 without a buffer layer, thereby exhibiting an excellent interfacial resistance characteristic, and also exhibiting an excellent high voltage stability, compared to Comparative Example 1.

Evaluation Example 6: Surface Cu Distribution Evaluation

High-angle annular dark field (HAADF) Scanning Transmission Electron Microscope (STEM) and energy dispersive X-ray spectroscopy (EDS) analysis were conducted on a cross-section of the positive active material prepared in Preparation Example 1.

Figure 10A:
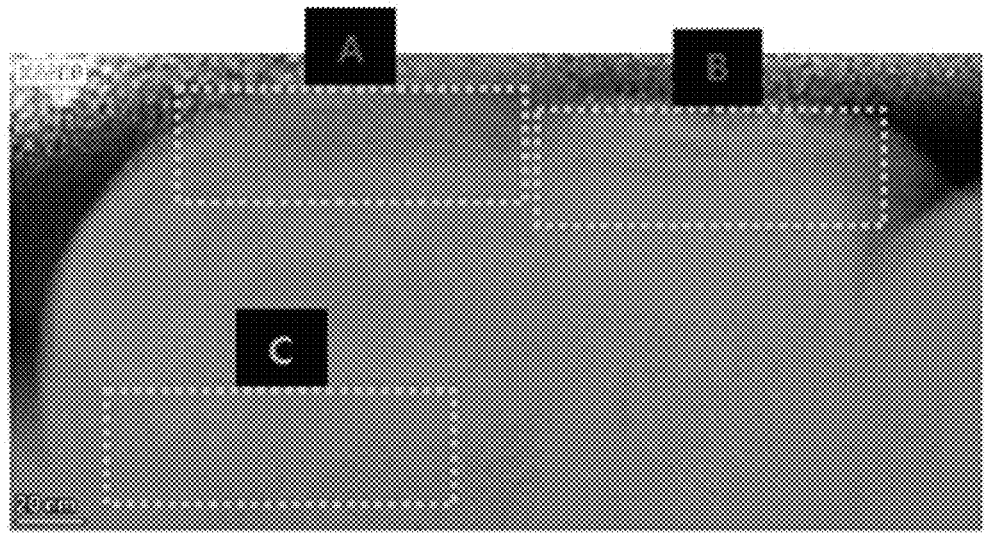
FIGS. 10A to 10C are high-angle annular dark field (HAADF) scanning transmission electron microscope (STEM) and energy dispersive X-ray spectroscopy (EDS) images showing the cross-section of a secondary particle of the positive active material prepared in Preparation Example 1.
Figure 10B:
Figure 10C:
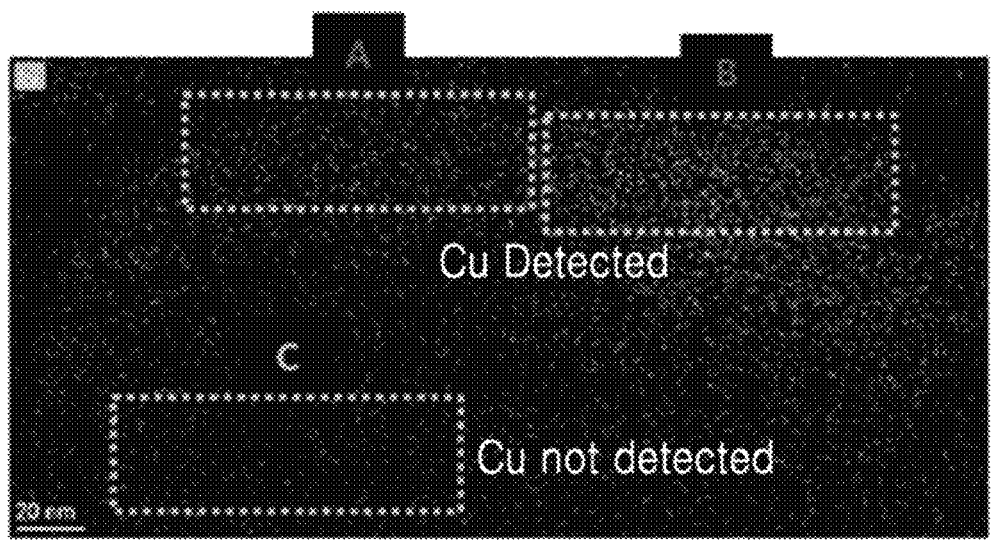
Figure 10D:
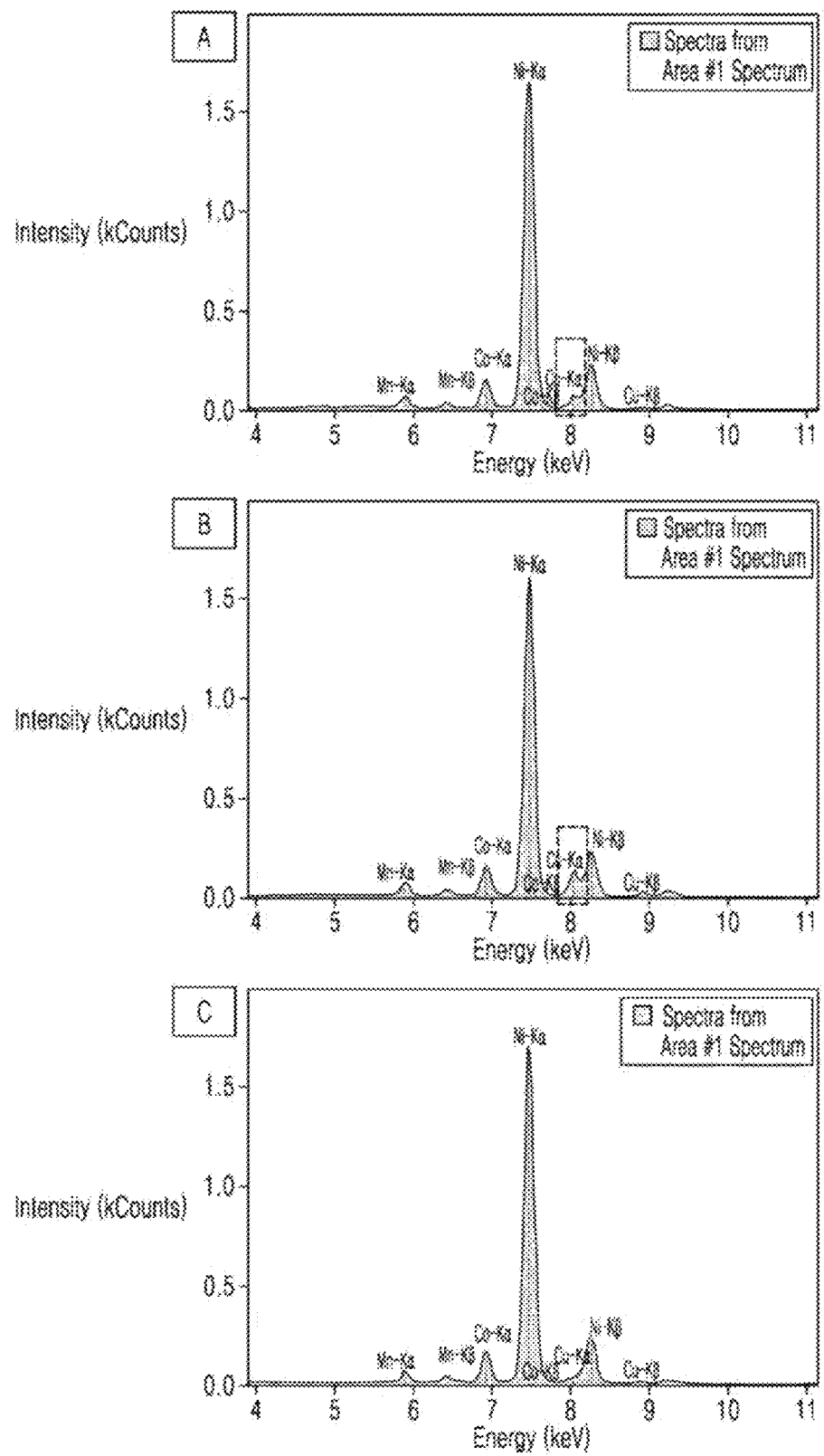
FIG. 10D is an EDS spectrum of regions A, B, and C shown in FIG. 10A.

FIGS. 10A to 10C are HAADF STEM and EDS images, showing the cross-section of the secondary particle of the positive active material prepared in Preparation Example 1, and FIG. 10D is an EDS spectrum of the A, B, and C regions shown in FIG. 10A.

As shown in FIGS. 10A to 10D, in the positive active material of Preparation Example 1, the buffer layer including the copper compound was coated on the surface, or near the surface of the active material secondary particle with an island type coating method, and the coating width was about 200 nm.

Figure 11A:
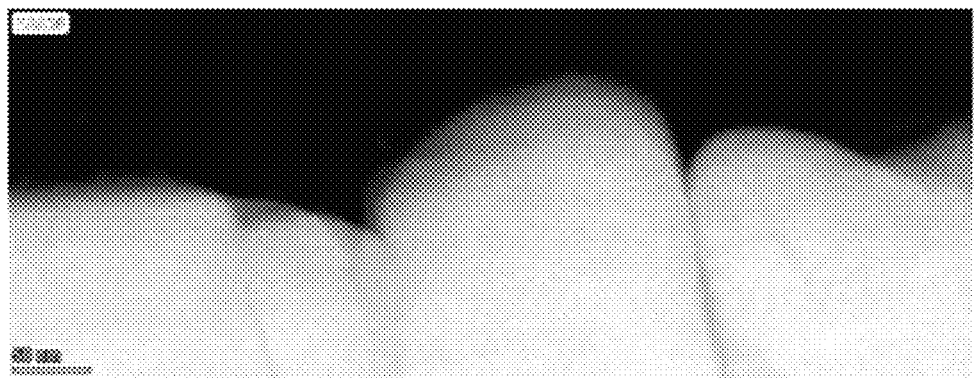
FIGS. 11A and 11B are HAADF STEM and EDS images showing the cross-section of the secondary particle (the region where a large number of primary particles are observed) of the positive active material prepared in Preparation Example 1.
Figure 11B:
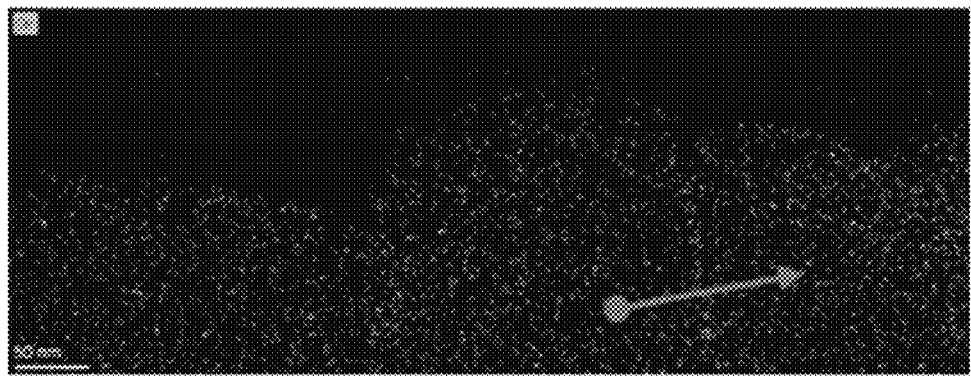
Figure 11C:
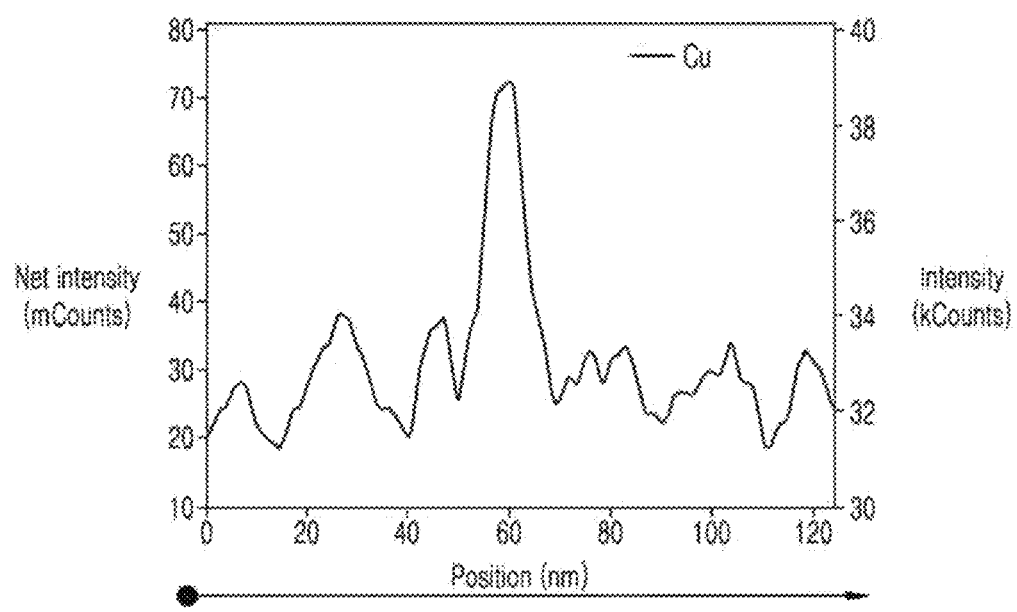
FIG. 11C is a graph showing the EDS line profile of Cu as its position is changed in the direction of the arrow in FIG. 11B.

FIGS. 11A and 11B are HAADF STEM, and EDS images, that show the cross-section of the secondary particle (the region where a large number of primary particles are observed) of the positive active material prepared in Preparation Example 1, and FIG. 11C is a graph showing the EDS line profile of Cu as its position was changed in the direction of an arrow.

As shown in FIGS. 11A to 11C, in the positive active material prepared in Preparation Example 1, Cu was found to be distributed evenly in the interface area of the primary particles that form secondary particles, and thus the buffer layer was formed not only on the surface of the secondary particles of the active material, but also on the interface of the primary particles.

Evaluation Example 7: Buffer Layer Phase Evaluation

Figure 12A:
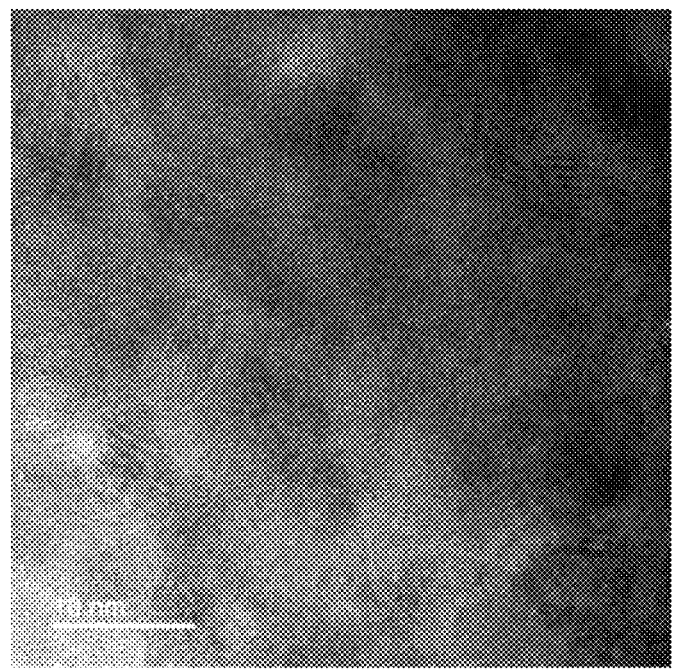
FIG. 12A shows a high-resolution transmission electron microscope (HRTEM) image of a buffer layer of the positive active material prepared in Preparation Example 1.
Figure 12B:
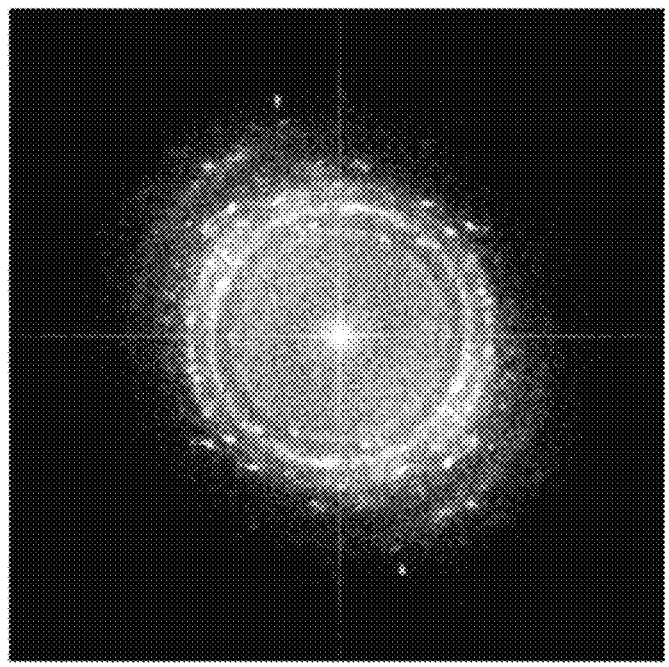
FIG. 12B shows a fast Fourier transform (FFT) pattern thereof.

FIG. 12A is a high-resolution transmission electron microscope (HRTEM) image of the buffer layer of the positive active material prepared in Preparation Example 1, and FIG. 12B shows the fast Fourier transform (FFT) pattern of the same.

As shown in FIGS. 12A and 12B, the buffer layer formed on the positive active material prepared in Preparation Example 1, had a Li—Cu—Cl type nano crystal form.

Evaluation Example 8: EELS Spectrum Evaluation

Figure 13A:
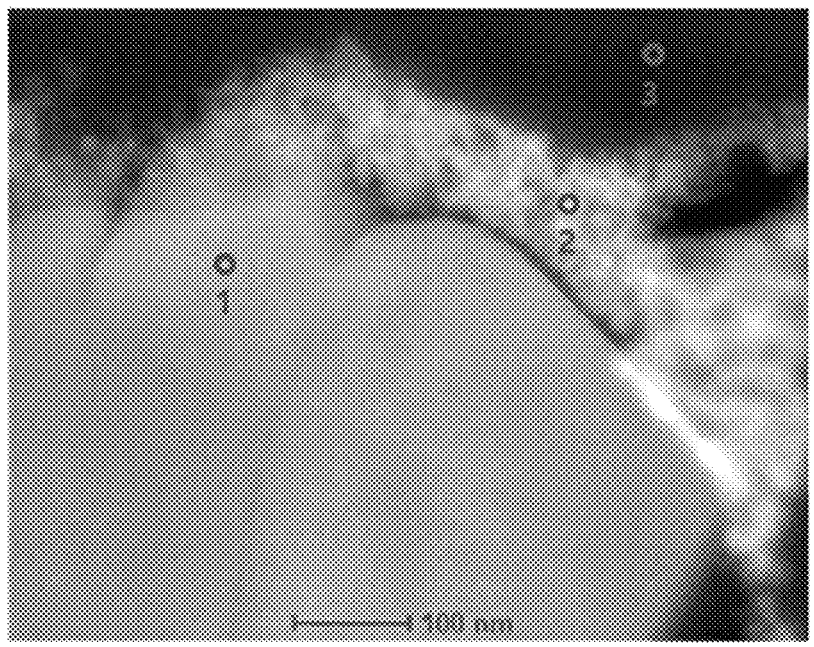
FIG. 13A is a HAADF STEM image of a cross-section of the cathode layer prepared in Example 1, in which area (1) is a positive active material portion of an NCM bulk region, area (2) is a buffer layer portion having a high Cu distribution, and area (3) is a region coated with analytical polymers.

FIG. 13A is a HAADF STEM image for a cross-section of a cathode layer prepared in Example 1, in which area (1) is a positive active material portion of the NCM bulk region, area (2) is a buffer layer portion having a high Cu distribution, and area (3) is a region coated with a polymer.

Figure 13B:
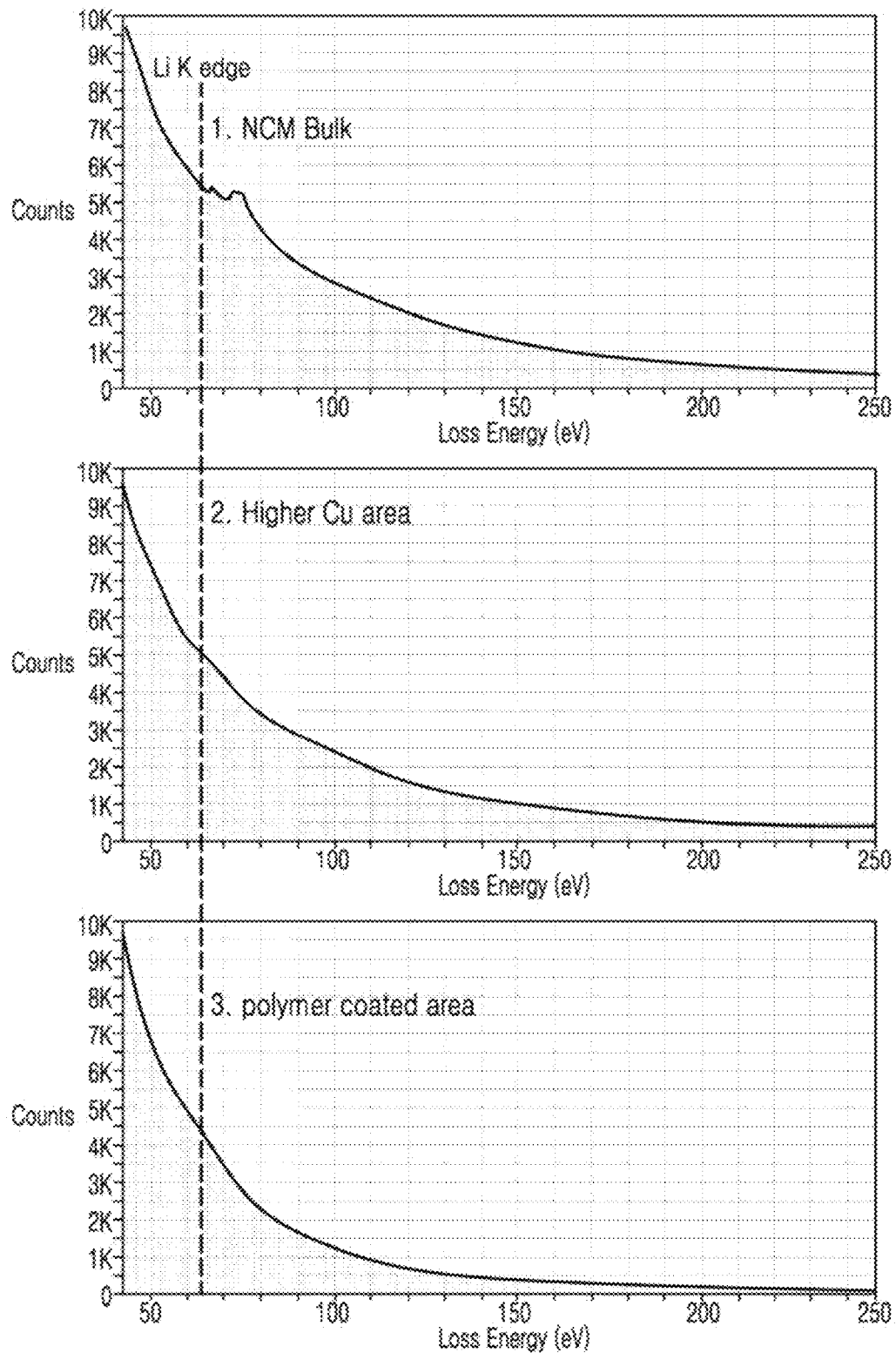
FIG. 13B is an electron energy loss spectroscopy (EELS) analysis spectrum of areas (1), (2), and (3) of FIG. 13A.

FIG. 13B is an electron energy loss spectroscopy (EELS) analysis spectrum of areas (1), (2), (3).

As shown in FIGS. 13A and 13B, a trace amount of Li was detected in a buffer layer region having a high Cu distribution, and thus a Cu buffer layer including Li was covering the active material surface.

Evaluation Example 9: XPS Analysis

Figure 14:
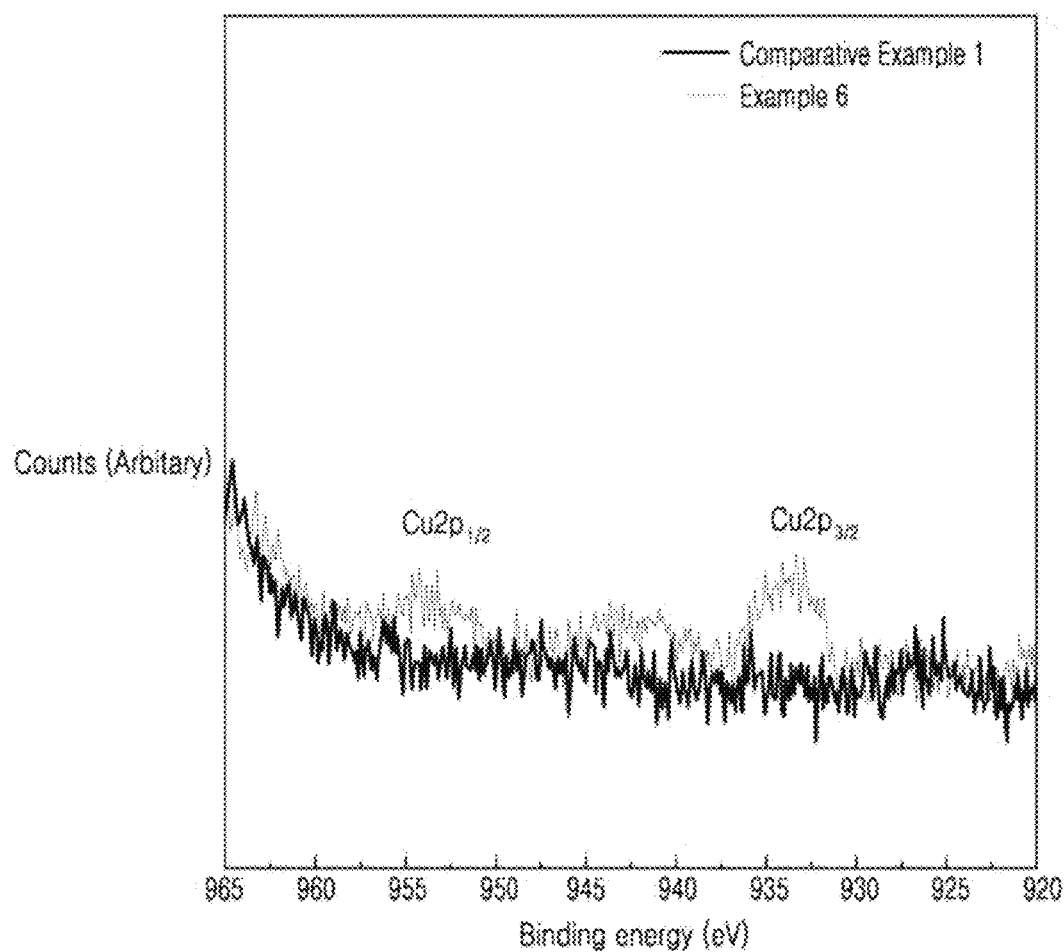
FIG. 14 is a result of X-ray photoelectron analysis (XPS) for a Cu peak in XPS performed on the buffer layer of the positive active materials prepared in Preparation Example 6 and Comparative Preparation Example 1.
Figure 15:
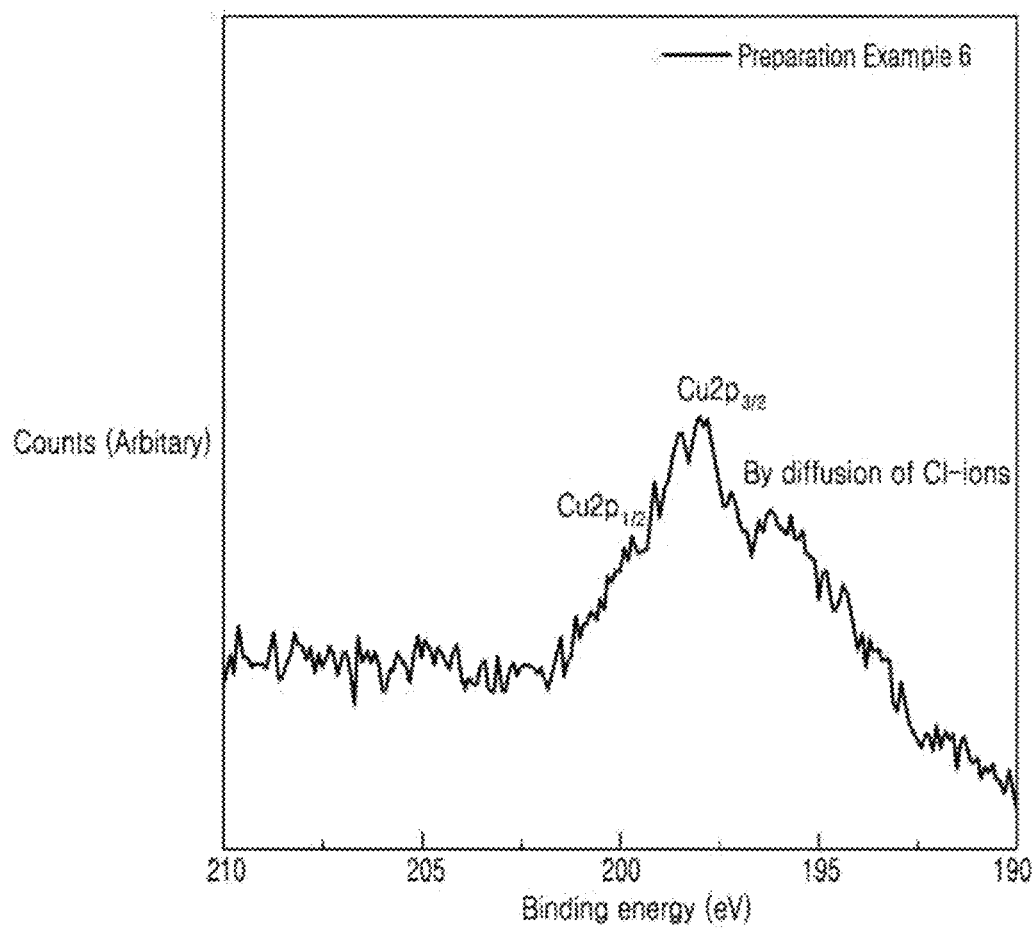
FIG. 15 is a result of X-ray photoelectron analysis (XPS) for a Cl peak in XPS performed on the buffer layer of the positive active material prepared in Preparation Example 6.

X-ray photoelectron analysis (XPS) was conducted on the buffer layer of the positive active materials prepared in Preparation Example 6 and Comparative Example 1, and XPS analysis results for Cu peak are shown in FIG. 14, and XPS analysis results for Cl peak are shown in FIG. 15.

As shown in FIG. 14, the $Cu2p_{1/2}$ characteristic peak appeared at 951.8 eV and 954.0 eV, and the $Cu2p_{3/2}$ characteristic peak appeared at 932.5 eV and 934.0 eV, which means most Cu atoms existed in the buffer in the form of Cu composites, or lithium Cu composites with oxidation number of +1 or +2.

As shown in FIG. 15, the $Cl2p_{1/2}$ and $Cl2p_{3/2}$ characteristic peaks are shown in 199.9 EV and 198.1 EV respectively, which means they existed in the buffer layer in the form of Cu-halides or lithium-Cu-halides.

Evaluation Example 10: ICP Analysis

In order to determine the amount of the elements included in the buffer layer of the positive active materials prepared in Preparation Examples 4 to 6, they were analyzed according to the Inductively Coupled Plasma Spectroscopy (ICP) method. ICP-AES (ICP 5300DV, Perkinelemer) was used as an ICP analysis device.

After 0.1 g of each positive active material was taken, 2 ml of distilled water and 3 ml of concentrated nitric acid were added, the lid was closed, and the sample was dissolved. Thereafter, when the sample was completely dissolved, 50 ml of ultrapure water was added and diluted. Then, the diluted solution was then diluted again with ultrapure water 10 times the amount of the solution, and then it was analyzed with an ICP. The ICP device was operated under the following conditions: forward power of 1,300 W; torch height of 15 mm; plasma gas flow of 15.00 L/min; Sample gas flow of 0.8 L/min; Auxiliary gas flow of 0.20 L/min and pump speed of 1.5 ml/min. As a result, the amount of the element included in the buffer layer of the positive active material is shown in Table 3 below.

Figure 16:
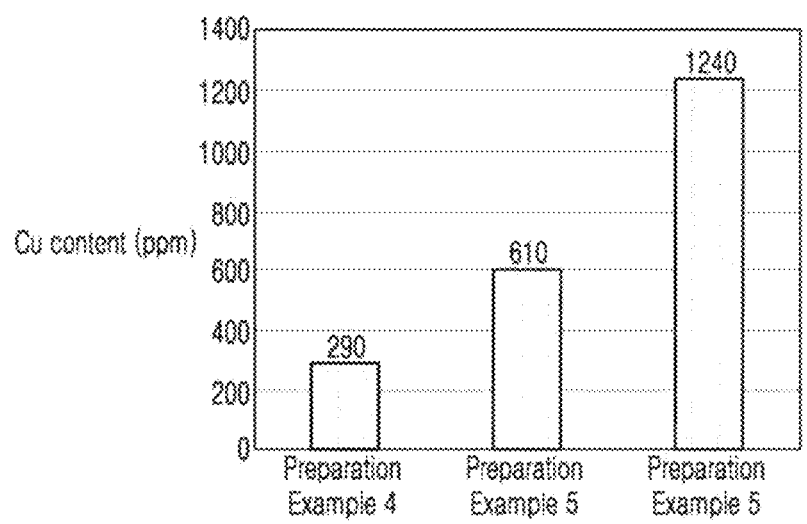
FIG. 16 is a result of measurement of Cu content (ppm) included in the buffer layer of the positive active materials prepared in Preparation Examples 4 to 6.

In addition, the Cu content (ppm, by weight) included in the buffer layers of the positive active materials prepared in Preparation Examples 4 to 6 are shown in FIG. 16. Here, Cu content refers to the mass of copper with respect to one million of the total mass of the buffer layer.

TABLE 3

| | Sample | Buffer layer coating amount | Li Li/Me | Ni | Co mol % | Mn | Cu |
|---|---|---|---|---|---|---|---|
| Preparation Example 4 | Ni90 NCM positive active material | Cu 0.05 mol % | 1.05 | 90.41 | 6.89 | 2.66 | 0.05 |
| Preparation Example 5 | | Cu 0.10 mol % | 1.05 | 90.38 | 6.87 | 2.65 | 0.10 |
| Preparation Example 6 | | Cu 0.20 mol % | 1.04 | 90.25 | 6.91 | 2.63 | 0.20 |

As may be seen in Table 3 and FIG. 16, Cu mol % ratio of the input/output $CuCl_2$ was 1 in all the Preparation Examples of 4 to 6, and thus a Cu buffer layer was coated on the active material without a loss of the raw material of $CuCl_2$ in the preparation process.

Evaluation Example 11: Comparison of Interfacial Resistance by Content

As in Evaluation Example 5, a torque cell was prepared using the positive active materials of Preparation Examples 1 to 6 and Comparative Preparation Example 1, and an electrochemical evaluation was conducted. The interfacial resistance value of each torque cell is shown in FIG. 17.

Figure 17:
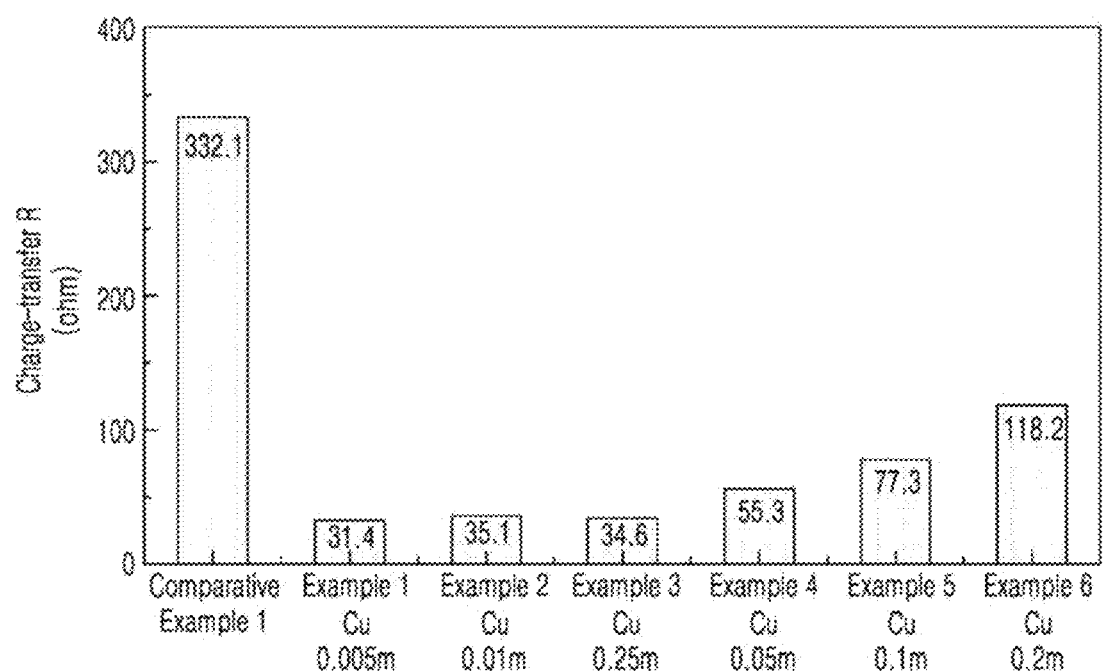
FIG. 17 is a result of high voltage stability measurement of the torque cell prepared by using the positive active materials of Preparation Examples 1 to 6 and Comparative Preparation Example 1.

As shown in FIG. 17, it may be seen even if the $CuCl_2$ content of the buffer layer was increased to 0.2 mol %, the interfacial resistance was remarkably lowered, compared with Comparative Example 1, and a stable interface state was maintained. On the other hand, the lower the $CuCl_2$ content in the buffer layer, the lower the interfacial resistance derived.

Evaluation Example 12: Lifetime Evaluation

For all-solid secondary batteries prepared according to Examples 1 and 7 to 9, a lifetime characteristic was evaluated as in Evaluation Example 3.

Figure 18:
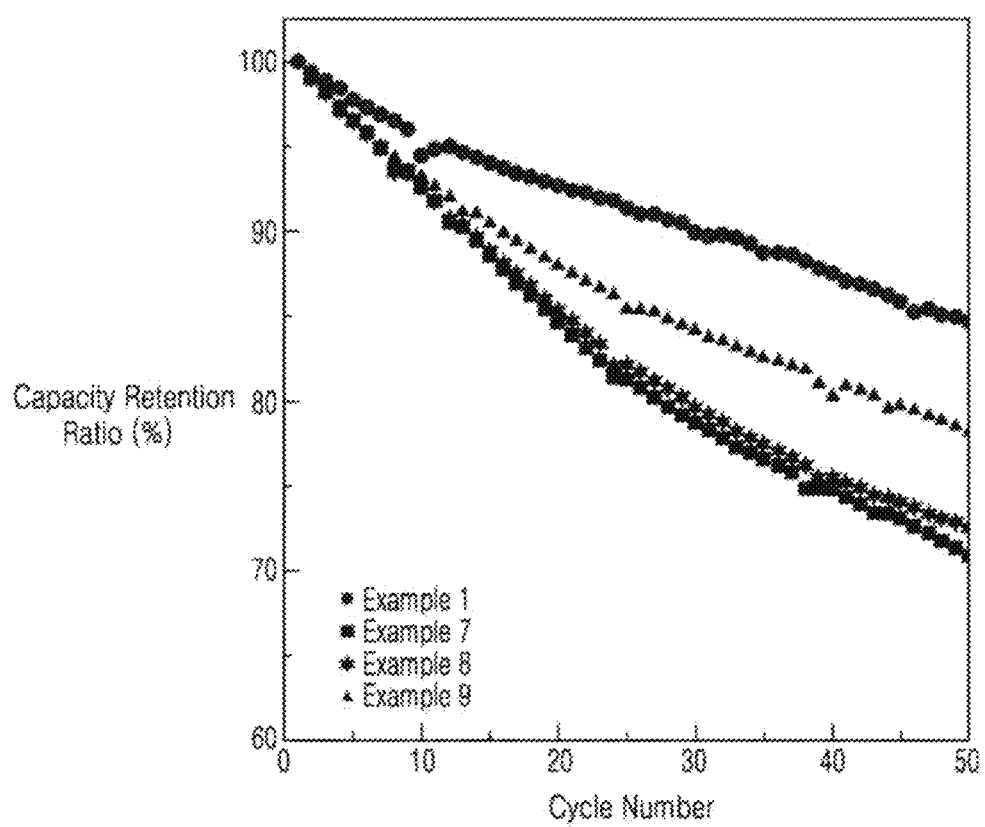
FIG. 18 is a result of lifespan characteristic evaluation of the all-solid secondary batteries prepared according to Examples 1 and 7 to 9.

As shown in FIG. 18, the all-solid secondary batteries prepared according to Examples 1 and 7 to 9 had better lifetime characteristic than Comparative Example 1, even though the coating amount of the buffer layer is small.

Evaluation Example 13: Impedance Measurement

Figure 19:
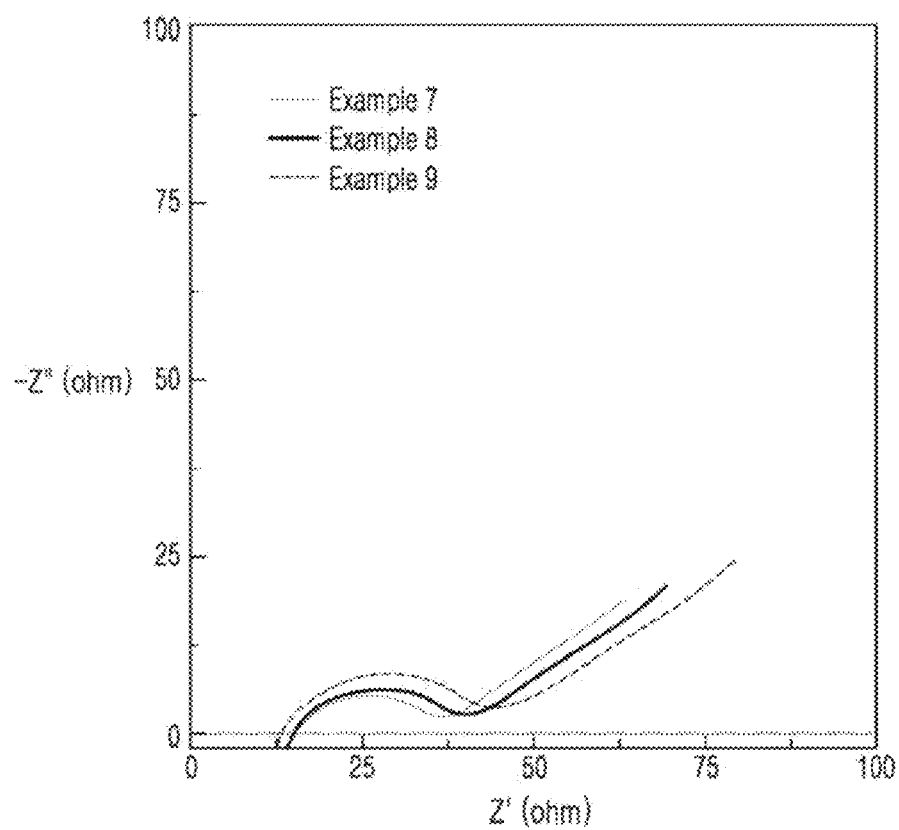
FIG. 19 is a result of impedance measurement of the all-solid secondary batteries prepared according to Examples 7 to 9.

For all-solid secondary batteries prepared according to Examples 7 to 9, impedance was measured, and the result is shown in FIG. 19 and Table 4.

TABLE 4

| Type | $R_{ct}$ |
|---|---|
| Comparative Example 1 | 332.1 |
| Example 7 | 22.3 |
| Example 8 | 25.9 |
| Example 9 | 31.6 |

As shown in FIG. 19 and Table 4, $R_{ct}$ (interfacial resistance) values of Examples 7 to 9 were significantly decreased than that of Comparative Example 1.

By way of summation and review, for solid electrolytes for an all-solid-state batteries, sulfide solid electrolytes having an excellent lithium-ion conductivity have been considered.

A sulfide solid electrolyte could cause irreversible lithium loss at an interface with the positive active material due to its high reactivity, and could rapidly reduce long-life characteristics.

The positive active material for an all-solid secondary battery according to an embodiment may help inhibit a resistance increase at an interface between the positive active material and the sulfide solid electrolyte and the irreversible lithium loss, thereby improving the lifetime characteristic of the all-solid secondary battery.

One or more embodiments may provide a positive active material for an all-solid secondary battery which is capable of improving the lifetime characteristic of an all-solid secondary battery including a sulfide solid electrolyte by suppressing the surface reaction between the sulfide solid electrolyte and the positive active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive active material for an all-solid secondary battery, the positive active material comprising:
    a secondary particle including a plurality of primary particles; and
    a buffer layer on a surface of the secondary particle; wherein:
    the secondary particle includes a nickel lithium transition metal oxide represented by Formula 1,
    the buffer layer includes a copper compound represented by Formula 2, $$Li_aNi_bM^1_cO_{2-e}A_e \qquad \text{<Formula 1>}$$

in Formula 1,
    $M^1$ is an element of Groups 4 to 14,
    A is F, S, Cl, Br, or a combination thereof; and
    a, b, c, and e satisfy the following relations: $0.9 \le a \le 1.3$, $0.5 \le b<1$, $0<c<1$, $b+c=1$, and $0 \le e<1$, $$Li_xCu_yX_z \qquad \text{<Formula 2>}$$

in Formula 2,
    X is a halogen, and
    x, y, and z satisfy the following relations: $1 \le x \le 3$, $1 \le y \le 5$, and $1 \le z \le 5$.

2. The positive active material for an all-solid secondary battery as claimed in claim 1, wherein, in Formula 2, X is F, Cl, Br, I, or a combination thereof.

3. The positive active material for an all-solid secondary battery as claimed in claim 1, wherein:
    the copper compound represented by Formula 2 is represented by Formula 2b, $$Li_xCu_yCl_z \qquad \text{<Formula 2b>}$$

in Formula 2b, x, y, and z satisfy the following relations: $1 \le x \le 3$, $1 \le y \le 5$, $1 \le z \le 5$.

4. The positive active material for an all-solid secondary battery as claimed in claim 1, wherein the positive active material includes the copper compound in an amount of about 0.0005 mol % to about 0.2 mol %, based on 100 mol % of the nickel lithium transition metal oxide.

5. The positive active material for an all-solid secondary battery as claimed in claim 1, wherein the positive active material includes the copper compound in an amount of about 0.005 mol % to about 0.1 mol %, based on 100 mol % of the nickel lithium transition metal oxide.

6. The positive active material for an all-solid secondary battery as claimed in claim 1, wherein the copper compound is further included at interfaces between the plurality of primary particles.

7. The positive active material for an all-solid secondary battery as claimed in claim 1, wherein the buffer layer is in a crystalline phase.

8. The positive active material for an all-solid secondary battery as claimed in claim 1, wherein the buffer layer is in a mixed phase of a crystalline phase and an amorphous phase.

9. The positive active material for an all-solid secondary battery as claimed in claim 1, wherein:
    the nickel lithium transition metal oxide represented by Formula 1 is represented by Formula 1a, $$Li_aNi_bM^2_cM^3_dO_{2-e}A_e \qquad \text{<Formula 1a>}$$

in Formula 1a,
    $M^2$ is Co, Mn, Al, or a combination thereof;
    $M^3$ is boron (B), magnesium (Mg), calcium (Ca), strontium (Sr), barium (Ba), titanium (Ti), vanadium (V), chromium (Cr), iron (Fe), copper (Cu)), zirconium (Zr), aluminum (Al), phosphorus (P), zinc (Zn), silicon (Si), niobium (Nb), cobalt (Co), or a combination thereof;
    A is F, S, Cl, Br, or a combination thereof; and
    a, b, c, d, and e satisfy the following relations: $0.8 \le a \le 1.2$, $0.7 \le b<1$, $0<c<1$, $0<d<1$, $b+c+d=1$, and $123\ e<1$.

10. The positive active material for an all-solid secondary battery as claimed in claim 1, wherein:
    the nickel lithium transition metal oxide represented by Formula 1 is represented by Formula 1b, $$Li_aNi_bCo_cM^4_dO_2 \qquad \text{<Formula 1b>}$$

in Formula 1b,
    $M^4$ is Al, Mn, Zr, Mg, or a combination thereof; and
    a, b, c, and d satisfy the following relations: $0.9 \le a \le 1.1$, $0.7 \le b<1$, $0<c \le 0.3$, $0<d \le 0.3$, and $b+c+d=1$.

11. The positive active material for an all-solid secondary battery as claimed in claim 1, wherein the nickel lithium transition metal oxide includes nickel in an amount of about 80 mol % to about 98 mol %, based on a total number of moles of transition metals in the nickel lithium transition metal oxide.

12. The positive active material for an all-solid secondary battery as claimed in claim 1, wherein the positive active material has a remainder of lithium of about 100 ppm or more.

13. A cathode for an all-solid secondary battery, the cathode including the positive active material for an all-solid secondary battery as claimed in claim 1.

14. The cathode for an all-solid secondary battery as claimed in claim 13, further comprising a solid electrolyte.

15. The cathode for an all-solid secondary battery as claimed in claim 14, wherein:
    the solid electrolyte is a sulfide solid electrolyte, and
    the sulfide solid electrolyte includes $Li_2S$—$P_2S_5$, $Li_2S$—$P_2S_5$—LiCl, $Li_2S$—$P_2S_5$—LiBr, $Li_2S$—$P_2S_5$—LiCl—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, in which m and n are each independently a positive number, and Z is Ge, Zn, or Ga, $Li_2S$-$GeS_2$, $Li_2S$-$SiS_2$-$Li_3PO_4$, $Li_2S$-$SiS_2$-$Li_pMO_q$, in which p and q are each independently a positive number, and M is P, Si, Ge, B, Al, Ga, or In, $Li_{7-x}PS_{6-x}Cl_x$, in which $0 \le x \le 2$, $Li_{z-x}PS_{6-x}Br_x$, in which $0 \le x \le 2$, and $Li_{7-x}PS_{6-x}I_x$, in which $0 \le x \le 2$.

16. The cathode for an all-solid secondary battery as claimed in claim 14, wherein the cathode includes the solid electrolyte in an amount of about 5 parts by weight to about 10 parts by weight, based on 100 parts by weight of the cathode.

17. An all-solid secondary battery, comprising:
a cathode layer;
an anode layer; and
a sulfide solid electrolyte layer between the cathode layer and the anode layer;
wherein the cathode layer includes the cathode as claimed in claim 13.

18. The all-solid secondary battery as claimed in claim 17, wherein, the sulfide solid electrolyte layer includes $Li_2S$—$P_2S_5$, $Li_2S$—$P_2S_5$—LiCl, $Li_2S$—$P_2S_5$—LiBr, $Li_2S$—$P_2S_5$—LiCl—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, in which m and n are each independently a positive number, and Z is Ge, Zn, or Ga, LizS-GeS2, LizS-SiS2-Li3PO4, LizS-SiS2-LipMOq, in which p and q are each independently a positive number, and M is P, Si, Ge, B, Al, Ga, or In, $i_{7-x}PS_{6-x}Cl_x$, in which $0 \leq x \leq 2$, $Li_{7-x}PS_{6-x}Br_x$, in which $0 \leq x \leq 2$, and $Li_{7-x}PS_{6-x}I_x$, in which $0 \leq x \leq 2$.

19. The all-solid secondary battery as claimed in claim 17, wherein:
the anode layer includes a negative electrode current collector and a negative active material layer on the negative electrode current collector,
the negative active material layer includes a negative active material and a binder,
the negative active material is in a particle form, and
an average particle diameter of the negative active material is about 4 um or less.

20. The all-solid secondary battery as claimed in claim 19, wherein:
the negative active material includes a carbon negative active material, a metal negative active material, or a metalloid negative active material, and
the carbon negative active material includes amorphous carbon or crystalline carbon.

21. A method of manufacturing the positive active material for an all-solid secondary battery as claimed in claim 1, the method comprising:
coating a nickel lithium transition metal oxide represented by the following Formula 1 with a coating solution including a catalyst and LiOH, the catalyst including $Cu_nX_m$, in which X is a halogen and n and m satisfy the following relations: $1 \leq n \leq 5$ and $1 \leq m \leq 5$, and drying and heat-treating the coated nickel lithium transition metal oxide, $$Li_aNi_bM^1_cO_{2-e}A_e \qquad \text{<Formula 1>}$$

wherein, in Formula 1,
$M^1$ is an element of Groups 4 to 14,
A is F, S, Cl, Br, or a combination thereof; and
a, b, c, and e satisfy the following relations: $0.9 \leq a \leq 1.3$, $0.5 \leq b < 1$, $0 < c < 1$, $b+c=1$, and $0 \leq e < 1$.

* * * * *